United States Patent
Kojima et al.

(10) Patent No.: US 11,804,788 B2
(45) Date of Patent: Oct. 31, 2023

(54) POWER CONVERTER

(71) Applicant: Mitsubishi Electric Corporation, Tokyo (JP)

(72) Inventors: Tetsuya Kojima, Tokyo (JP); Hisatoshi Fukumoto, Tokyo (JP); Kenji Fujiwara, Tokyo (JP); Akihiko Iwata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 95 days.

(21) Appl. No.: 17/609,405

(22) PCT Filed: Jun. 25, 2019

(86) PCT No.: PCT/JP2019/025165
§ 371 (c)(1),
(2) Date: Nov. 8, 2021

(87) PCT Pub. No.: WO2020/261384
PCT Pub. Date: Dec. 30, 2020

(65) Prior Publication Data
US 2022/0255457 A1    Aug. 11, 2022

(51) Int. Cl.
*H02M 7/483* (2007.01)
*H02M 1/32* (2007.01)
(Continued)

(52) U.S. Cl.
CPC ........... *H02M 7/487* (2013.01); *H02M 1/325* (2021.05); *H02M 7/483* (2013.01); *H02M 7/49* (2013.01);
(Continued)

(58) Field of Classification Search
CPC .... H02M 1/325; H02M 7/4835; H02M 7/487; H02M 7/5387
See application file for complete search history.

(56) References Cited

U.S. PATENT DOCUMENTS 8,625,307 B2   1/2014 Iwata
8,848,407 B2   9/2014 Blomberg
(Continued)

FOREIGN PATENT DOCUMENTS

JP   11-122943 A   4/1999
JP   2004-7941 A   1/2004
(Continued)

OTHER PUBLICATIONS

International Search Report and Written Opinion dated Aug. 6, 2019, received for PCT Application PCT/JP2019/025165, Filed on Jun. 25, 2019, 10 pages including English Translation.
(Continued)

*Primary Examiner* — Gary A Nash
(74) *Attorney, Agent, or Firm* — XSENSUS LLP

(57) ABSTRACT

A power converter includes an inverter circuit connected between the positive and negative terminals of a DC power supply, three single-phase bridge circuits each connected in series between an AC terminal of one of different phases of the inverter circuit and a motor, and a power conversion controller that generates gate signals to control operations of the inverter circuit and the three single-phase bridge circuits based on phase voltage commands. When a semiconductor switching element of the single-phase bridge circuits fails, the power conversion controller sets the output voltage of the single-phase bridge circuit of a phase to which the faulty semiconductor switching element belongs to zero to continue operation.

12 Claims, 16 Drawing Sheets

(51) Int. Cl.
  *H02M 7/5387* (2007.01)
  *H02M 7/487* (2007.01)
  *H02M 7/49* (2007.01)
  *H02M 7/537* (2006.01)

(52) U.S. Cl.
  CPC ......... *H02M 7/537* (2013.01); *H02M 7/4835* (2021.05); *H02M 7/5387* (2013.01)

(56) References Cited

U.S. PATENT DOCUMENTS

| | | | |
|---|---|---|---|
| 2011/0089765 A1 | 4/2011 | Iwata et al. | |
| 2011/0211381 A1* | 9/2011 | Iwata | H02M 7/4835 363/132 |
| 2012/0063181 A1 | 3/2012 | Chimento et al. | |
| 2012/0092915 A1* | 4/2012 | Okuda | H02M 7/487 363/132 |
| 2014/0043873 A1* | 2/2014 | Blomberg | H02J 3/1857 363/53 |
| 2016/0308478 A1* | 10/2016 | Sugiura | H02P 6/12 |
| 2017/0012549 A1* | 1/2017 | Abe | H02M 3/1588 |
| 2017/0294847 A1* | 10/2017 | Xie | H02M 1/0095 |

FOREIGN PATENT DOCUMENTS

| | | |
|---|---|---|
| JP | 2017-70064 A | 4/2017 |
| WO | 2009/116273 A1 | 9/2009 |
| WO | 2010/103600 A1 | 9/2010 |

OTHER PUBLICATIONS

Extended European Search Report dated Jun. 7, 2022 in European Patent Application No. 19935510.8, 9 pages.

\* cited by examiner

POWER CONVERTER

CROSS-REFERENCE TO RELATED APPLICATION

The present application is based on PCT filing PCT/JP2019/025165, filed Jun. 25, 2019, the entire contents of which are incorporated herein by reference.

FIELD

The present invention relates to a power converter that converts DC power into AC power to be supplied a load and supplies the AC power to the load even if a semiconductor switching element fails.

BACKGROUND

A power converter capable of continuing operation even if a semiconductor switching element fails is disclosed in Patent Literature 1 below. The power converter disclosed in Patent Literature 1 includes a basic circuit in which a plurality of parallel circuits each consisting of a single-phase inverter and a short-circuit switch are connected in series in each phase. Further, spare single-phase inverters are provided. The spare single-phase inverters are connected to the basic circuit via short-circuit switches. If a semiconductor switching element of a single-phase inverter of the basic circuit fails, the short-circuit switch of the single-phase inverter including the faulty semiconductor switching element is controlled to be on. By connecting a spare single-phase inverter to the phase of the faulty single-phase inverter, the operation of the power converter is continued.

CITATION LIST

Patent Literature

Patent Literature 1: Japanese Patent Application Laid-open No. 2017-70064

SUMMARY

Technical Problem

As described above, the conventional technique requires the addition of spare inverters and changeover switches to a basic circuit that supplies power under normal conditions, to configure a power converter capable of continuing power supply even if a semiconductor switching element fails. That is, the conventional technique additionally requires spare inverters that are not used under normal conditions and changeover switches that are operated under fault conditions. Thus, the conventional technique has a problem that the cost and size of the power converter increase.

The present invention has been made in view of the above. It is an object of the present invention to provide a power converter capable of continuing operation even if a semiconductor switching element fails, without newly providing a spare inverter.

Solution to Problem

In order to solve the above-described problems and achieve the object, the present invention relates to a power converter that converts DC power into AC power to a load and supply the AC power to the load. The power converter includes: an inverter circuit connected between the positive and negative terminals of a DC power supply; and three single-phase bridge circuits each connected in series between an AC terminal of one of different phases of the inverter circuit and the load. The power converter further includes a power conversion controller that generates gate signals to control operations of the inverter circuit and the three single-phase bridge circuits based on phase voltage commands. When a semiconductor switching element of one of the single-phase bridge circuits fails, the power conversion controller sets the output voltage of the single-phase bridge circuit of a phase to which the faulty semiconductor switching element belongs to zero to continue operation.

Advantageous Effects of Invention

The power converter according to the present invention has the effect of being able to continue operation of the power converter even if a semiconductor switching element fails, without newly providing a spare inverter.

DESCRIPTION OF EMBODIMENTS

Hereinafter, power converters according to embodiments of the present invention will be described in detail with reference to the accompanying drawings. Note that the following embodiments are not intended to limit the present invention.

First Embodiment

Figure 1:
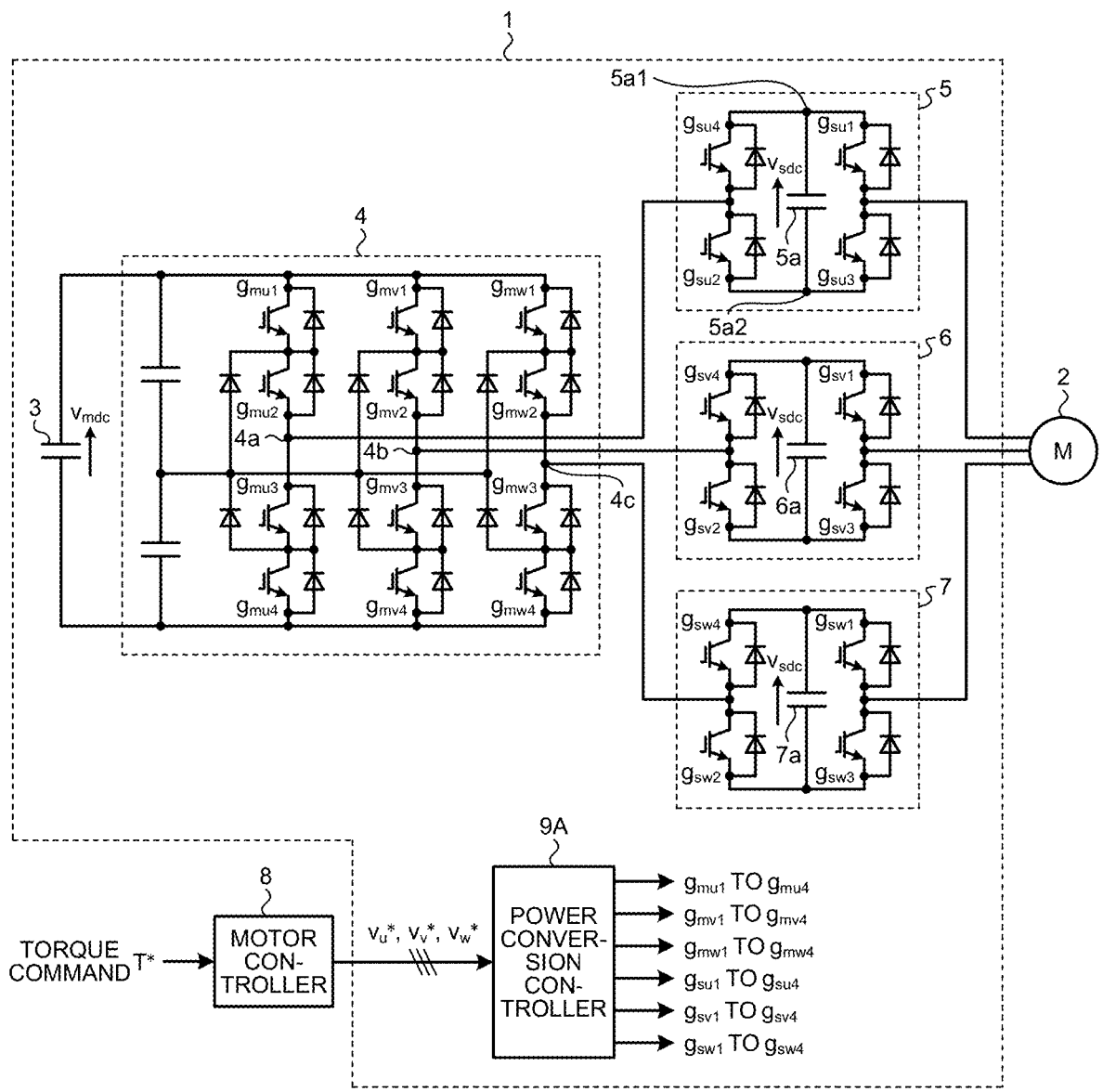
FIG. 1 is a circuit diagram illustrating a configuration of a power converter according to a first embodiment.

FIG. 1 is a circuit diagram illustrating a configuration of a power converter 1 according to a first embodiment. The power converter 1 according to the first embodiment is a power converter that converts DC power output from a DC power supply 3 into AC power to be supplied to a motor 2 as a load, and supplies the AC power to the motor 2. As illustrated in FIG. 1, the power converter 1 includes: an inverter circuit 4; single-phase bridge circuits 5, 6, and 7; and a power conversion controller 9A as a controller. The inverter circuit 4 is connected between the positive and negative terminals of the DC power supply 3. The single-phase bridge circuits 5, 6, and 7 are connected between AC terminals 4a, 4b, and 4c of different phases of the inverter circuit 4 and the corresponding phases of the motor 2 so as to be inserted in series, respectively. Although FIG. 1 illustrates a case where the inverter circuit 4 is a three-phase three-level inverter, the present invention is not limited thereto. The inverter circuit 4 may be a three-phase two-level inverter. Alternatively, the inverter circuit 4 may be a multiple-phase, that is, four or more-phase two-level inverter or three-level inverter.

Each single-phase bridge circuit includes two legs in each of which two semiconductor switching elements having a reverse conducting function are connected in series, and their connection points are used as connection terminals. The two legs are connected in parallel to each other, and a capacitor is connected in parallel to each leg. That is, the two legs and the capacitor are connected in parallel to each other. Of the two semiconductor switching elements connected in series, the semiconductor switching element connected to a high-potential-side terminal 5a1 of the capacitor may be referred to as a "positive-side semiconductor switching element", and the semiconductor switching element connected to a low-potential-side terminal 5a2 of the capacitor may be referred to as a "negative-side semiconductor switching element".

FIG. 1 illustrates insulated-gate bipolar transistors (IG-BTs) and antiparallel diodes connected in antiparallel to the IGBTs as semiconductor switching elements having a reverse conducting function. More specifically, silicon (Si) IGBTs, which are narrow bandgap semiconductor devices, are used as the semiconductor switching elements of the inverter circuit 4 and the single-phase bridge circuits 5, 6, and 7. If metal-oxide-semiconductor field-effect transistors (MOSFETs), which are transistor devices having a reverse conducting function themselves, or reverse-conducting (RC) IGBTs are used, the antiparallel diodes may be omitted.

A torque command T* is input to a motor controller 8. The motor controller 8 calculates phase voltage commands $v_u^*$, $v_v^*$, and $v_w^*$ of sinusoidal voltages so that torque generated in the motor 2 becomes a desired torque based on the torque command T*, and outputs the phase voltage commands $v_u^*$, $v_v^*$, and $v_w^*$ to the power conversion controller 9A. The power conversion controller 9A generates gate signals $g_{mu1}$ to $g_{mu4}$, $g_{mv1}$ to $g_{mv4}$, $g_{mw1}$ to $g_{mw4}$, $g_{su1}$ to $g_{su4}$, $g_{sv1}$ to $g_{sv4}$, and $g_{sw1}$ to $g_{sw4}$ for switching control of the semiconductor switching elements of the inverter circuit 4 and the semiconductor switching elements of the single-phase bridge circuits 5, 6, and 7 so that voltages based on the phase voltage commands $v_u^*$, $v_v^*$, and $v_w^*$ are applied to the motor 2. The gate signals $g_{mu1}$ to $g_{mu4}$ are a shortened expression of four gate signals $g_{mu1}$, $g_{mu2}$, $g_{mu3}$, and $g_{mu4}$. The same applies to the others.

The gate signals $g_{mu1}$ to $g_{mu4}$, $g_{mv1}$ to $g_{mv4}$, and $g_{mw1}$ to $g_{mw4}$ are gate signals to be applied to the gates of the semiconductor switching elements of the inverter circuit 4. Specifically, the gate signal $g_{mu1}$ is a gate signal to be applied to a first semiconductor switching element of a first phase (e.g., the u phase); the gate signal $g_{mu2}$ is a gate signal to be applied to a second semiconductor switching element of the first phase; the gate signal $g_{mu3}$ is a gate signal to be applied to a third semiconductor switching element of the first phase; and the gate signal $g_{mu4}$ is a gate signal to be applied to a fourth semiconductor switching element of the first phase. The first to fourth semiconductor switching elements are connected in series. Both ends of a set of the four semiconductor switching elements connected in series are electrically connected between the positive and negative terminals of the DC power supply 3. Sets of the semiconductor switching elements of the other phases are connected likewise.

The gate signal $g_{mv1}$ is a gate signal to be applied to a first semiconductor switching element of a second phase (e.g., the v phase); the gate signal $g_{mv2}$ is a gate signal to be applied to a second semiconductor switching element of the second phase; the gate signal $g_{mv3}$ is a gate signal to be applied to a third semiconductor switching element of the second phase; and the gate signal $g_{mv4}$ is a gate signal to be applied to a fourth semiconductor switching element of the second phase.

The gate signal $g_{mw1}$ is a gate signal to be applied to a first semiconductor switching element of a third phase (e.g., the w phase); the gate signal $g_{mw2}$ is a gate signal to be applied to a second semiconductor switching element of the third phase; the gate signal $g_{mw3}$ is a gate signal to be applied to a third semiconductor switching element of the third phase; and the gate signal $g_{mw4}$ is a gate signal to be applied to a fourth semiconductor switching element of the third phase.

The gate signals $g_{su1}$ to $g_{su4}$ are gate signals to be applied to the gates of the semiconductor switching elements of the single-phase bridge circuit 5. Specifically, the gate signal $g_{su1}$ is a gate signal to be applied to a first semiconductor switching element located on the high-potential side of a first leg; the gate signal $g_{su2}$ is a gate signal to be applied to a second semiconductor switching element on the low-potential side of a second leg; the gate signal $g_{su3}$ is a gate signal to be applied to a third semiconductor switching element on the low-potential side of the first leg; and the gate signal $g_{su4}$ is a gate signal to be applied to a fourth semiconductor switching element on the high-potential side of the second leg. The first and third semiconductor switching elements are connected in series in this order, constituting the first leg. Both ends of the first leg are electrically connected to both ends of a capacitor 5a. Likewise, the fourth and second semiconductor switching elements are connected in series in this order, constituting the second leg. Both ends of the second leg are electrically connected to both ends of the capacitor 5a.

The gate signals $g_{sv1}$ to $g_{sv4}$ are gate signals to be applied to the gates of the semiconductor switching elements of the single-phase bridge circuit 6. Specifically, the gate signal $g_{sv1}$ is a gate signal to be applied to a first semiconductor switching element located on the high-potential side of a first leg; the gate signal $g_{sv2}$ is a gate signal to be applied to a second semiconductor switching element on the low-potential side of a second leg; the gate signal $g_{sv3}$ is a gate signal to be applied to a third semiconductor switching element on the low-potential side of the first leg; and the gate signal $g_{sv4}$ is a gate signal to be applied to a fourth semiconductor switching element on the high-potential side of the second leg. The first and third semiconductor switching elements are connected in series in this order, constituting the first leg. Both ends of the first leg are electrically connected to both ends of a capacitor 6a. Likewise, the fourth and second semiconductor switching elements are connected in series in this order, constituting the second leg. Both ends of the second leg are electrically connected to both ends of the capacitor 6a.

The gate signals $g_{sw1}$ to $g_{sw4}$ are gate signals to be applied to the gates of the semiconductor switching elements of the single-phase bridge circuit 7. Specifically, the gate signal $g_{sw1}$ is a gate signal to be applied to a first semiconductor switching element located on the high-potential side of a first leg; the gate signal $g_{sw2}$ is a gate signal to be applied to a second semiconductor switching element on the low-potential side of a second leg; the gate signal $g_{sw3}$ is a gate signal to be applied to a third semiconductor switching element on the low-potential side of the first leg; and the gate signal $g_{sw4}$ is a gate signal to be applied to a fourth semiconductor switching element on the high-potential side of the second leg. The first and third semiconductor switching elements are connected in series in this order, constituting the first leg. Both ends of the first leg are electrically connected to both ends of a capacitor 7a. Likewise, the fourth and second semiconductor switching elements are connected in series in this order, constituting the second leg. Both ends of the second leg are electrically connected to both ends of the capacitor 7a.

In the configuration of FIG. 1, voltages applied to the motor 2 are positive or negative DC voltages that are proper combinations of the DC voltage of the DC power supply 3 and the DC-side capacitor voltages of the single-phase bridge circuits 5, 6, and 7 subjected to addition or subtraction with the combinations and the polarity taken into consideration. The DC-side capacitor voltages are the voltages of the capacitors 5a, 6a, and 7a. The DC voltage of the DC power supply 3 is denoted as "$v_{mdc}$", and the absolute value of the DC-side capacitor voltages of the single-phase bridge circuits 5, 6, and 7 is denoted as "$v_{sdc}$". The directions of arrows given beside the symbols $v_{mdc}$ and $v_{sdc}$ represent the polarity. In the first embodiment, the absolute value $v_{sdc}$ of the DC-side capacitor voltages of the single-phase bridge circuits 5, 6, and 7 is held at the phase-voltage step width of the inverter circuit 4. In the first embodiment, the phase-voltage step width is about ½ of half the voltage of the DC power supply 3.

In a case where the output voltages of the single-phase bridge circuits 5, 6, and 7 are connected in series in the configuration of the first embodiment, it is known that an output voltage closer to a sine wave is obtained by setting the output voltages to values different by the step widths of the respective phase voltages in the single-phase bridge circuits 5, 6, and 7, that is, by setting the DC voltage of each phase to a value different by two times each. For details, refer to "Masaki Yamada et al.: 'Development of a New Voltage Sag Compensator with a Gradationally Controlled Voltage Inverter', IEEJ transactions, Vol. 127-D, No. 4, pp. 451-456 (2007)".

Figure 2:
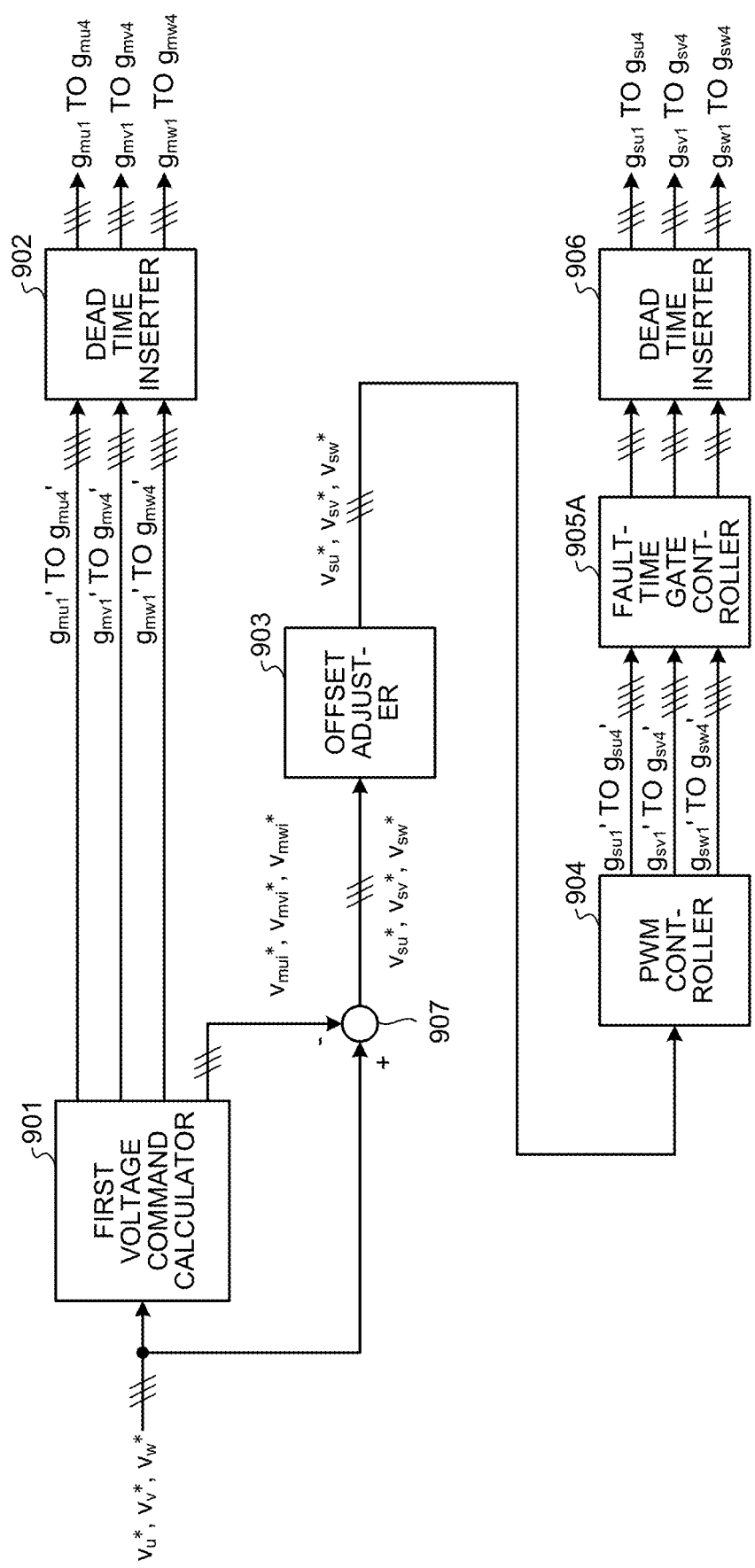
FIG. 2 is a block diagram illustrating a configuration of a power conversion controller in the first embodiment.

FIG. 2 is a block diagram illustrating a configuration of the power conversion controller 9A in the first embodiment. As illustrated in FIG. 2, the power conversion controller 9A in the first embodiment includes: a first voltage command calculator 901; dead time inserters 902 and 906; an offset adjuster 903; a pulse-width modulation (PWM) controller 904; a fault-time gate controller 905A; and a subtracter 907.

Figure 3:
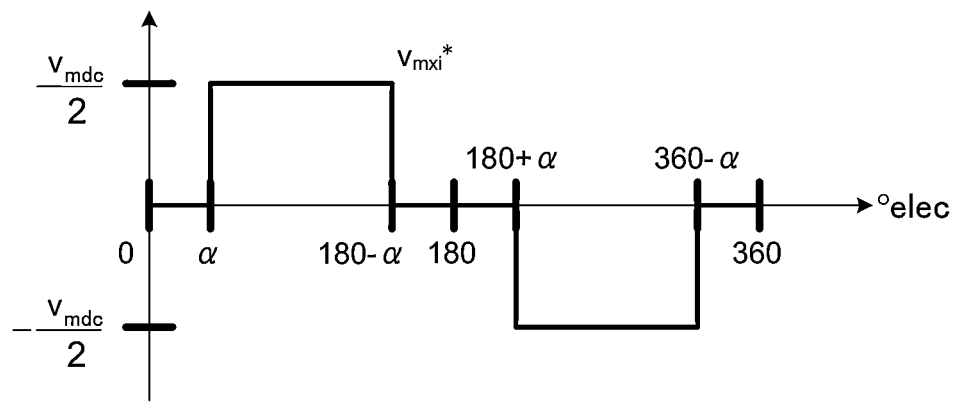
FIG. 3 is a diagram illustrating an example of a one phase's waveform of first voltage commands generated by a first voltage command calculator in FIG. 2.

The first voltage command calculator 901 calculates first voltage commands $v_{mui}^*$, $v_{mvi}^*$, and $v_{mwi}^*$ to command the inverter circuit 4. FIG. 3 illustrates a one-phase waveform of the first voltage commands $v_{mui}^*$, $v_{mvi}^*$, and $v_{mwi}^*$. FIG. 3 is a diagram illustrating an example of a one phase's waveform of the first voltage commands generated by the first voltage command calculator 901 in FIG. 2.

The voltage waveform illustrated in FIG. 3 is a single pulse voltage whose absolute value is ½ of the DC voltage $v_{mdc}$ of the DC power supply 3 and whose polarity is a positive or negative voltage each repeated once in the fundamental wave period of the phase voltage commands $v_u^*$, $v_v^*$, and $v_w^*$. The fundamental wave period is a period from 0° elec to 360° elec in the figure. Using a single pulse voltage reduces the number of times of switching of the inverter. Consequently, switching loss is reduced, and the efficiency of the inverter is improved.

In FIG. 3, the first voltage commands are represented by $v_{mxi}^*$. The subscript x in this symbol represents any one of the u, v, and w phases. A similar symbol may be used as appropriate for the phase voltage commands. The horizontal axis in FIG. 3 represents the phase of the phase voltage command $v_x^*$, and the unit is the electrical angle (° elec).

As illustrated in FIG. 3, the single pulse voltage representing the first voltage command $v_{mxi}^*$ has a voltage waveform that changes according to the phase and the phase angle α of the phase voltage command $v_x^*$. Details of the phase angle α will be described below. In this document, the phase angle α may be referred to as a "first phase angle".

Specifically, in the example of FIG. 3, the value of the single pulse voltage changes such that the value is a zero value at phase zero, becomes a positive value at phase a, returns to the zero value at phase 180−α, becomes a negative value at phase 180+α, and returns to the zero value at phase 360−α. When the electrical angle is replaced with radians to rephrase the change in another expression, the value of the single pulse voltage: is the zero value when the phase is in the ranges of zero to α, Π−α to Π+α, and 2Π−α to 2Π; is the positive value when the phase is in the range of α to Π−α; and is the negative value when the phase is in the range of Π+α to 2Π−α. Note that the zero value referred to here does not mean an absolutely zero value, and is allowed to take a value close to zero. That is, the zero value referred to here is a concept including values considered to be zero.

Here, to equalize the fundamental wave components of both the phase voltage command $v_x^*$ and the first voltage command $v_{mxi}^*$, the above-described phase angle α is determined by the following formula where $v_{php}$ is the amplitude of the phase voltage command $v_x^*$.

[Formula 1]

$$\alpha = \cos^{-1}\left(v_{php} \frac{\pi}{2v_{mdc}}\right) \quad (1)$$

Setting as in the above formula (1) means that the inverter circuit 4 outputs the voltages of the fundamental wave components, sharing all the power of the fundamental wave components to be supplied to the motor 2. This setting eliminates the need for DC power supplies on the DC side of the single-phase bridge circuits 5, 6, and 7, reducing the size and cost of the power converter 1. In this case, capacitors or the like are connected on the DC side for smoothing the voltages. The capacitors 5a, 6a, and 7a described above are the capacitors referred to here.

In normal times, the command values of the DC-side capacitor voltages of the single-phase bridge circuits 5, 6, and 7 are held at about ½ of half the voltage of the DC power supply 3 for the inverter circuit 4. If disturbance occurs, causing the DC-side capacitor voltages of the single-phase bridge circuits 5, 6, and 7 to become larger than the command values, the share of the inverter circuit 4 is reduced, and the share of the single-phase bridge circuits 5, 6, and 7 is increased. This can reduce variations in the DC voltage. While on the contrary, if the DC-side capacitor voltages of the single-phase bridge circuits 5, 6, and 7 become smaller than the command values, the share of the inverter circuit 4 is increased to reduce the share of the single-phase bridge circuits 5, 6, and 7. Consequently, the DC-side capacitor voltages of the single-phase bridge circuits 5, 6, and 7 can be held at the command values.

Returning to the description of FIG. 2, the first voltage command calculator 901 generates the first voltage commands $v_{mui}^*$, $v_{mvi}^*$, and $v_{mwi}^*$, while at the same time generating gate signals $g_{mu1}'$ to $g_{mu4}'$ to $g_{mv4}'$, and $g_{mw1}'$ to $g_{mw4}'$ to output voltages based on the first voltage commands $v_{mui}^*$, $v_{mvi}^*$, and $v_{mwi}^*$. However, at this point in time, dead times for preventing arm short circuits in the inverter circuit 4 are not inserted.

Table 1 below shows the relationships between the gate signals to the inverter circuit 4 and the first voltage command $v_{mxi}^*$ to command the inverter circuit 4. The first voltage command calculator 901 generates the gate signals to the inverter circuit 4 using the relationships in Table 1.

TABLE 1

| INSTANTANEOUS VOLTAGE COMMAND $v_{mxi}^*$ | $-v_{mdc}/2$ | 0 | $v_{mdc}/2$ |
|---|---|---|---|
| $g_{mx1}$ | L | L | H |
| $g_{mx2}$ | L | H | H |
| $g_{mx3}$ | H | H | L |
| $g_{mx4}$ | H | L | L |

Figure 4:
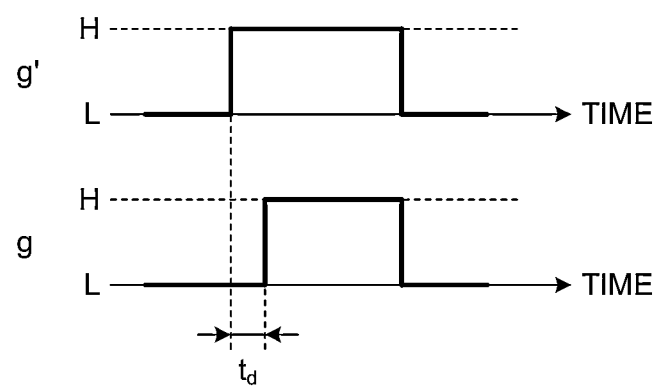
FIG. 4 is a diagram illustrating a dead time insertion method in a dead time inserter in the first embodiment.

The dead time inserter 902 inserts dead times into the gate signals $g_{mu1}'$ to $g_{mu4}'$ to $g_{mv4}'$, and $g_{mw1}'$ to $g_{mw4}'$, generating new gate signals $g_{mu1}$ to $g_{mu4}$, $g_{mv1}$ to $g_{mv4}$, and $g_{mw1}$ to $g_{mw4}$. FIG. 4 illustrates a dead time insertion method. FIG. 4 is a diagram illustrating a dead time insertion method in the dead time inserter 902 in the first embodiment.

In FIG. 4, a waveform g' in the top portion indicates a gate signal before dead time insertion, and a waveform g in the bottom portion indicates the gate signal after the dead time insertion. In this document, H represents high, and L represents low. In this document, as illustrated in FIG. 4, dead time insertion is performed such that a gate signal is delayed by a dead time $t_d$ at the timing when the gate signal goes from L to H. The same applies to the other embodiments.

The subtracter 907 subtracts the first voltage commands $v_{mui}^*$, $v_{mvi}^*$, and $v_{mwi}^*$ to command the inverter circuit 4 from the phase voltage commands $v_u^*$, $v_v^*$, and $v_w^*$, generating second voltage commands $v_{su}^*$, $v_{sv}^*$, and $v_{sw}^*$ to command the single-phase bridge circuits 5, 6, and 7. That is, the first voltage command calculator 901 and the subtracter 907 divide the phase voltage commands $v_u^*$, $v_v^*$, and $v_w^*$ into the first voltage commands $v_{mui}^*$, $v_{mvi}^*$, and $v_{mwi}^*$ and the second voltage commands $v_{su}^*$, $v_{sv}^*$, and $v_{sw}^*$. The subtracter 907 calculates the second voltage commands $v_{su}^*$, $v_{sv}^*$, and $v_{sw}^*$ so as to offset the common-mode voltage of the inverter circuit 4.

The common-mode voltage is a voltage to be the source of common-mode noise. The common-mode voltage is a voltage that causes zero-phase currents flowing through cables connecting the inverter and the load or the stray capacitance of the load when the neutral potential of the load varies. When the common-mode voltage varies greatly, zero-phase currents flow through cables connecting the single-phase bridge circuits 5, 6, and 7 and the motor 2 or the stray capacitance of the motor 2, generating common-mode noise, which adversely affects peripheral equipment or deteriorates the bearings of the motor 2. Thus, the smaller the value and variation of the common-mode voltage, the better.

In the subtracter 907, when the sum of the first voltage commands is positive, a common voltage component is superimposed on the three-phase phase voltage commands so that the sum of the second voltage commands becomes negative (a non-positive value). When the sum of the first voltage commands is negative, a common voltage component is superimposed on the three-phase phase voltage commands so that the sum of the second voltage commands becomes positive (a non-negative value). Consequently, the common-mode voltage is suppressed, and, as a result, the common-mode noise is reduced.

The second voltage commands $v_{su}^*$, $v_{sv}^*$, and $v_{sw}^*$ are input to the offset adjuster 903. In the offset adjuster 903, a three-phase common voltage is superimposed so that the maximum value of the second voltage commands $v_{su}^*$, $v_{sv}^*$, and $v_{sw}^*$ does not exceed the absolute value of the DC-side capacitor voltages of the corresponding single-phase bridge circuits.

The PWM controller 904 generates gate signals $g_{su1}'$ to $g_{su4}'$, $g_{sv1}'$ to $g_{sv4}'$, and $g_{sw1}'$ to $g_{sw4}'$ before dead time insertion in the single-phase bridge circuits 5, 6, and 7 so that voltages based on the second voltage commands $v_{su}^*$, $v_{sv}^*$, and $v_{sw}^*$ are output.

Figure 5:
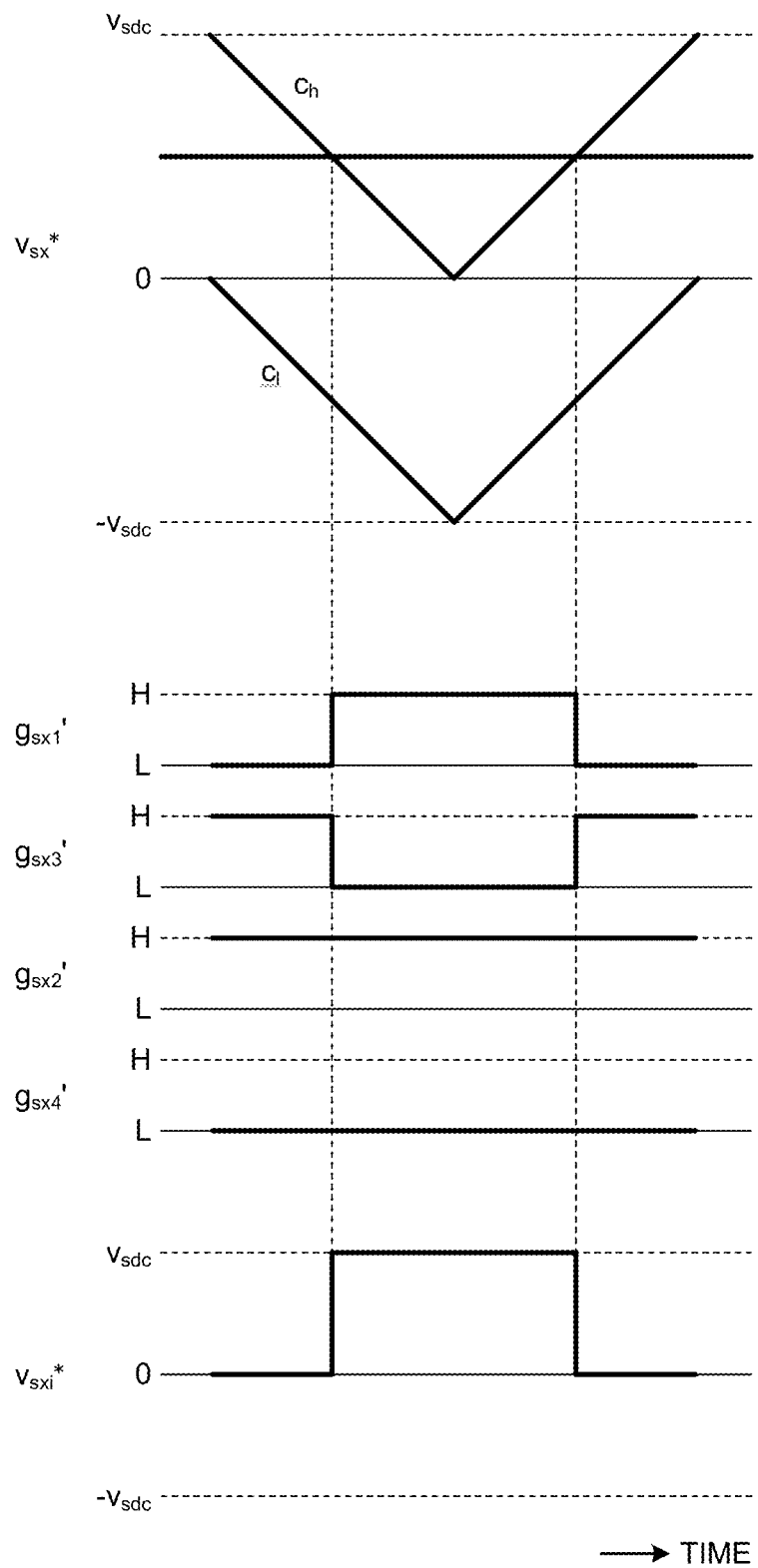
FIG. 5 is a first diagram for explaining operation in a PWM controller in the first embodiment.
Figure 6:
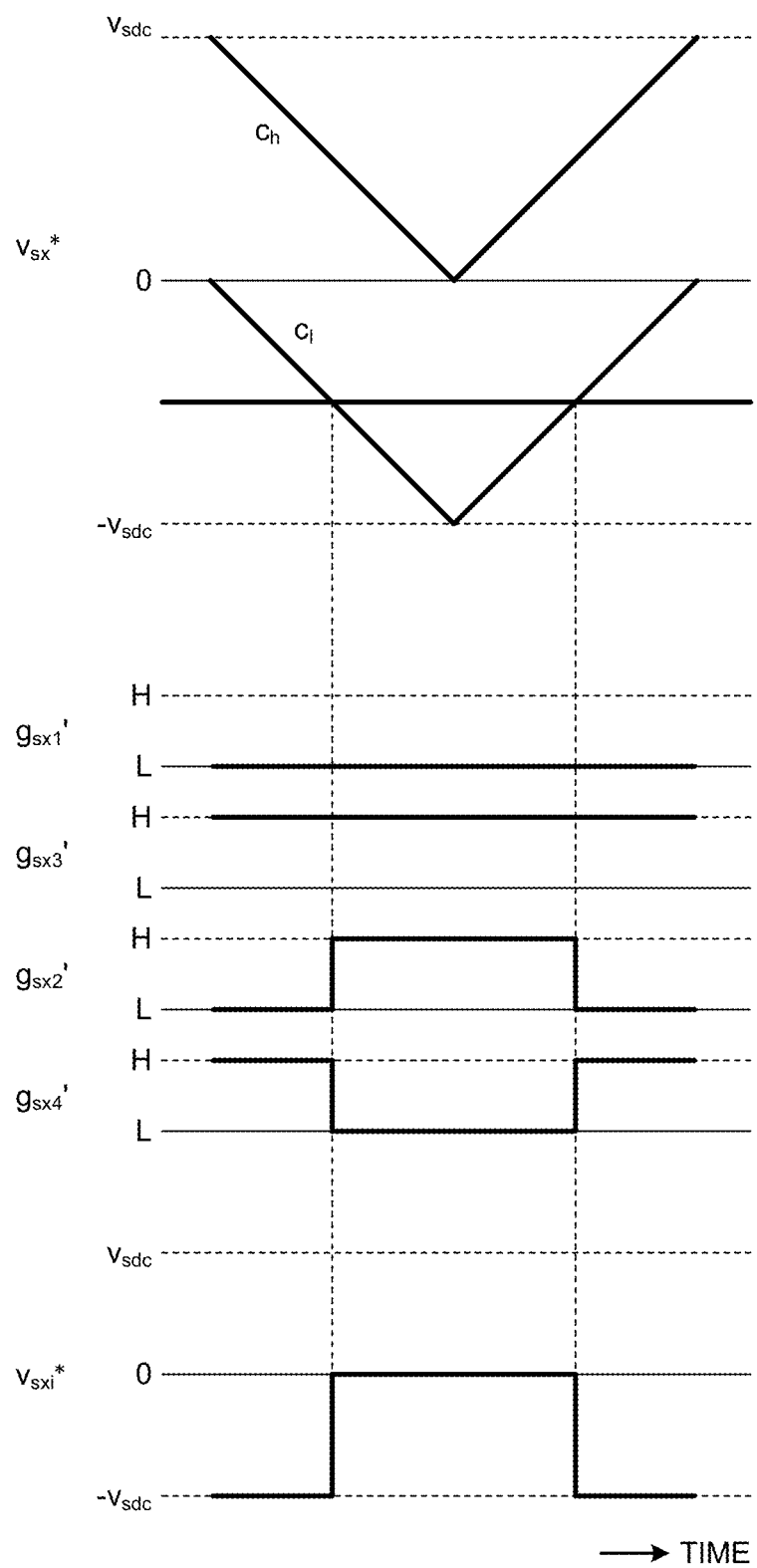
FIG. 6 is a second diagram for explaining the operation in the PWM controller in the first embodiment.

FIG. 5 is a first diagram for explaining operation in the PWM controller 904 in the first embodiment. FIG. 6 is a second diagram for explaining the operation in the PWM controller 904 in the first embodiment. The horizontal axes in FIGS. 5 and 6 each represent time. In FIGS. 5 and 6, from the top portion side, signals of the second voltage command $v_{sx}^*$, the gate signals $g_{sx1}'$, $g_{sx3}'$, $g_{sx2}'$, and $g_{sx4}'$, and a single-phase voltage command $v_{sxi}^*$ are indicated by thick lines. In the top portion where the second voltage command $v_{sx}^*$ is indicated, waveforms of an upper carrier signal $c_h$ and a lower carrier signal $c_l$ are indicated by thick lines. The period of the upper carrier signal $c_h$ and the period of the lower carrier signal $c_l$ are the same. The period of the upper carrier signal $c_h$ and the lower carrier signal $c_l$ is referred to as a "carrier period".

The PWM controller 904 compares the value of the second voltage command $v_{sx}^*$ with the value of the upper carrier signal $c_h$ to generate the gate signals $g_{sx1}'$ and $g_{sx3}'$. The PWM controller 904 compares the value of the second voltage command $v_{sx}^*$ with the value of the lower carrier signal $c_l$ to generate the gate signals $g_{sx2}'$ and $g_{sx4}'$. The upper carrier signal $c_h$ is a triangular-wave signal that varies between a zero voltage value and a maximum value $v_{sdc}$ of voltage to be output by the single-phase bridge circuits 5, 6, and 7. The lower carrier signal $c_l$ is a triangular-wave signal that varies between a minimum value $-v_{sdc}$ of voltage to be output by the single-phase bridge circuits 5, 6, and 7 and a zero voltage value. In this document, the maximum value of voltage to be output by the single-phase bridge circuits 5, 6, and 7 may be referred to as a "first voltage", and the minimum value of voltage to be output by the single-phase bridge circuits 5, 6, and 7 may be referred to as a "second voltage".

As illustrated in FIG. 5, when $v_{sx}^* > c_h$, is set to H, and $g_{sx3}'$ is set to L, and when $v_{sx}^* \leq c_h$, is set to L, and $g_{sx3}'$ is set to H. As illustrated in FIG. 6, when $v_{sx}^* \geq c_l$, $g_{sx2}'$ is set to H, and $g_{sx4}'$ is set to L, and when $v_{sx}^* < c_l$, $g_{sx2}'$ is set to L, and $g_{sx4}'$ is set to H. The single-phase voltage command $v_{sxi}^*$ as an instantaneous value is illustrated in the bottom portions of FIGS. 5 and 6. A time average value obtained by integrating the single-phase voltage command $v_{sxi}^*$ over one period of the carrier period is the second voltage command $v_{sx}^*$. That is, by the PWM control using the second voltage commands $v_{sx}^*$, voltages based on the second voltage commands $v_{sx}^*$ as average values can be output from the single-phase bridge circuits 5, 6, and 7.

Table 2 below illustrates the relationships between the gate signals to the single-phase bridge circuits 5, 6, and 7 and the single-phase voltage commands $v_{sxi}^*$ to command the single-phase bridge circuits 5, 6, and 7. The PWM controller 904 and the dead time inserter 906 generate the gate signals to the single-phase bridge circuits 5, 6, and 7 using the relationships in Table 2 while inserting dead times as described in FIG. 4.

TABLE 2

| SINGLE-PHASE VOLTAGE COMMAND $v_{sxi}^*$ | $-v_{sdc}$ | 0 | $v_{sdc}$ |
|---|---|---|---|
| $g_{sx1}$ | L | L | H |
| $g_{sx2}$ | L | H | H |
| $g_{sx3}$ | H | H | L |
| $g_{sx4}$ | H | L | L |

As described above, the first embodiment uses PWM control to generate gate signals by comparing voltage commands with triangular waves. In the first embodiment, the switching frequency of the single-phase bridge circuits 5, 6, and 7 is made higher than the switching frequency of the inverter circuit 4. The switching frequency of the single-phase bridge circuits 5, 6, and 7 is the reciprocal of the carrier period. This allows the supply of power with less harmonic components to the motor 2 as a load while reducing the switching loss of the inverter circuit 4. As described above, in the first embodiment, the DC-side capacitor voltages of the single-phase bridge circuits 5, 6, and 7 are set to about ½ of half the voltage of the DC power supply 3. This allows the single-phase bridge circuits 5, 6, and 7 to use semiconductor switching elements having a high switching frequency and to reduce switching loss.

Figure 7:
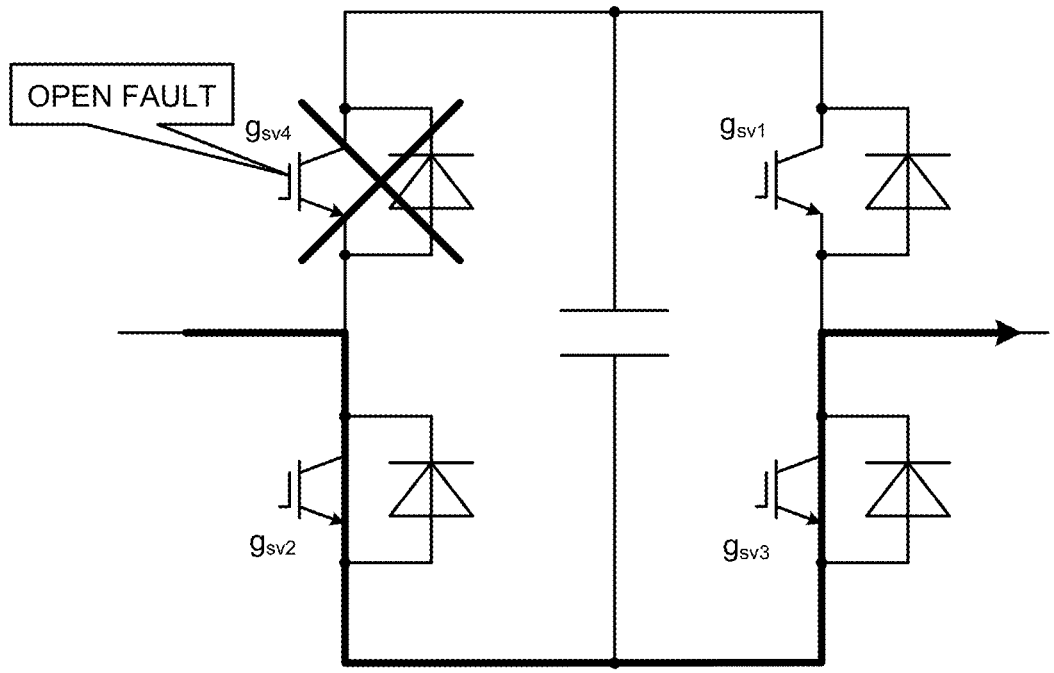
FIG. 7 is a first diagram for explaining operation in a fault-time gate controller in the first embodiment.
Figure 8:
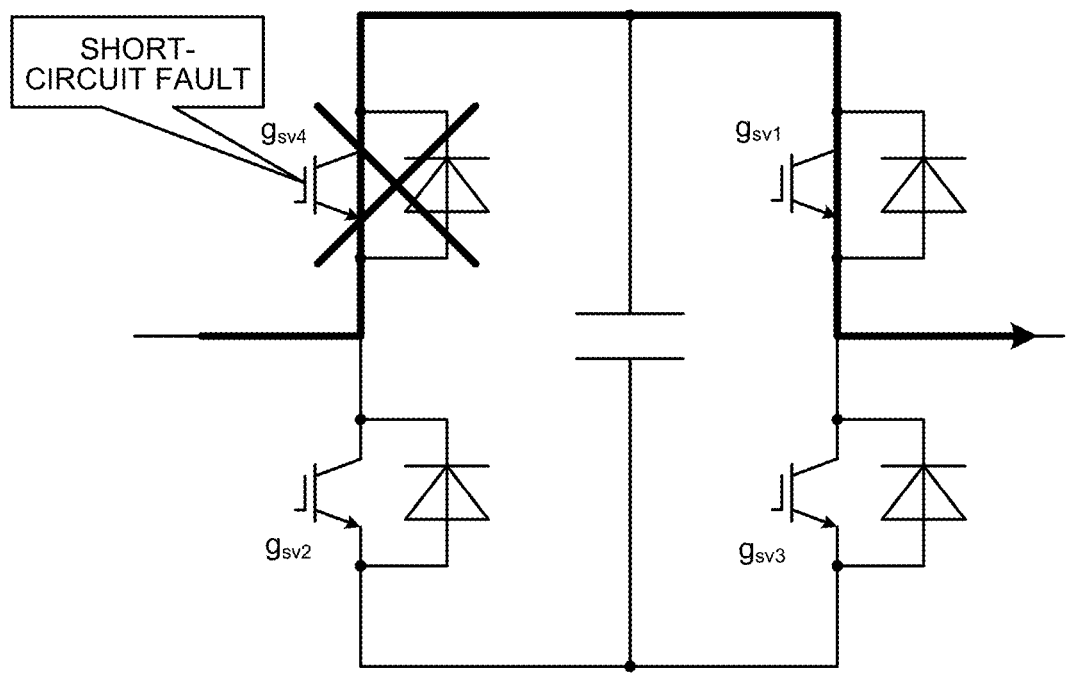
FIG. 8 is a second diagram for explaining operation in the fault-time gate controller in the first embodiment.

FIG. 7 is a first diagram for explaining operation in the fault-time gate controller 905A in the first embodiment. Specifically, FIG. 7 illustrates a situation in which the fourth semiconductor switching element of the single-phase bridge circuit 6 illustrated in FIG. 1 has an open fault. FIG. 8 is a second diagram for explaining operation in the fault-time gate controller 905A in the first embodiment. Specifically, FIG. 8 illustrates a situation in which the fourth semiconductor switching element of the single-phase bridge circuit 6 illustrated in FIG. 1 has a short-circuit fault. In FIGS. 7 and 8, each semiconductor switching element is an RC-IGBT.

The fault-time gate controller 905A corrects the gate signals to be input to the single-phase bridge circuit according to the position on the circuit and the fault status of the semiconductor switching element. The expression "according to the fault status" referred to here means that it is identified whether the semiconductor switching element has a short-circuit fault or an open fault. The expression "according to the position on the circuit" referred to here means identifying the leg and the positive or negative of the arm of the faulty semiconductor switching element. If a semiconductor switching element fails, the output voltage of the single-phase bridge circuit of the phase to which the faulty semiconductor switching element belongs is controlled to zero. FIGS. 7 and 8 illustrate the single-phase bridge circuit 6. The phase to which the faulty semiconductor switching element belongs is the v phase. The phase to which the faulty semiconductor switching element belongs may be referred to as a "faulty phase".

In the case of the fault illustrated in FIG. 7, the positive-side semiconductor switching elements cannot be controlled to be on due to the open fault. Therefore, by controlling to turn on the two negative-side semiconductor switching elements in both legs, that is, the two semiconductor switching elements in the opposite-side arm, the output voltage is made zero. Although the output voltage is controlled to zero, it goes without saying that a voltage drop corresponding to the on resistance of the two semiconductor switching elements occurs. That is, the expression "output voltage zero" referred to here means controlling to a state where the output voltage of the single-phase bridge circuit is considered to be zero.

In the case of the fault illustrated in FIG. 8, the positive-side semiconductor switching elements cannot be controlled to be off due to the short-circuit fault. In this case, if the negative-side semiconductor switching element in the same leg is controlled to be on, the DC voltage applied to the leg is short-circuited. Therefore, to make the output voltage zero, the two positive-side semiconductor switching elements including the positive-side semiconductor switching element with the short-circuit fault are controlled to be on to turn on the two positive-side semiconductor switching elements in both legs, that is, the two semiconductor switching elements in the same-side arm.

Although not illustrated, if a negative-side semiconductor switching element has an open fault, the two positive-side semiconductor switching elements are controlled to be on. If a negative-side semiconductor switching element has a short-circuit fault, the two negative-side semiconductor switching elements including the negative-side semiconductor switching element with the short-circuit fault are controlled to be on to turn on the two negative-side semiconductor switching elements. Table 3 below illustrates the correspondence relationships between the fault status and the gate signals.

TABLE 3

| FAULT STATUS | POSITIVE-SIDE OPEN FAULT OR NEGATIVE-SIDE SHORT-CIRCUIT FAULT | POSITIVE-SIDE SHORT-CIRCUIT FAULT OR NEGATIVE-SIDE OPEN FAULT |
|---|---|---|
| $g_{sx1}$ | L | H |
| $g_{sx2}$ | H | L |
| $g_{sx3}$ | H | L |
| $g_{sx4}$ | L | H |

The dead time inserter 906 inserts dead times into the gate signals generated by the fault-time gate controller 905A, generating the gate signals $g_{su1}$ to $g_{su4}$, $g_{sv1}$ to $g_{sv4}$, and $g_{sw1}$ to $g_{sw4}$ to be input to the single-phase bridge circuits 5, 6, and 7.

In the first embodiment, fault determination is performed using the voltage of the semiconductor switching element and the gate signal. Specifically, if the gate signal is H but the voltage of the semiconductor switching element is not reduced to a voltage equivalent to the On voltage, the fault is determined to be an open fault. If the gate signal is L but the voltage is reduced to a voltage equivalent to the On voltage, the fault is determined to be a short-circuit fault. Note that the method described here is an example, and other methods may be used.

Figure 9:
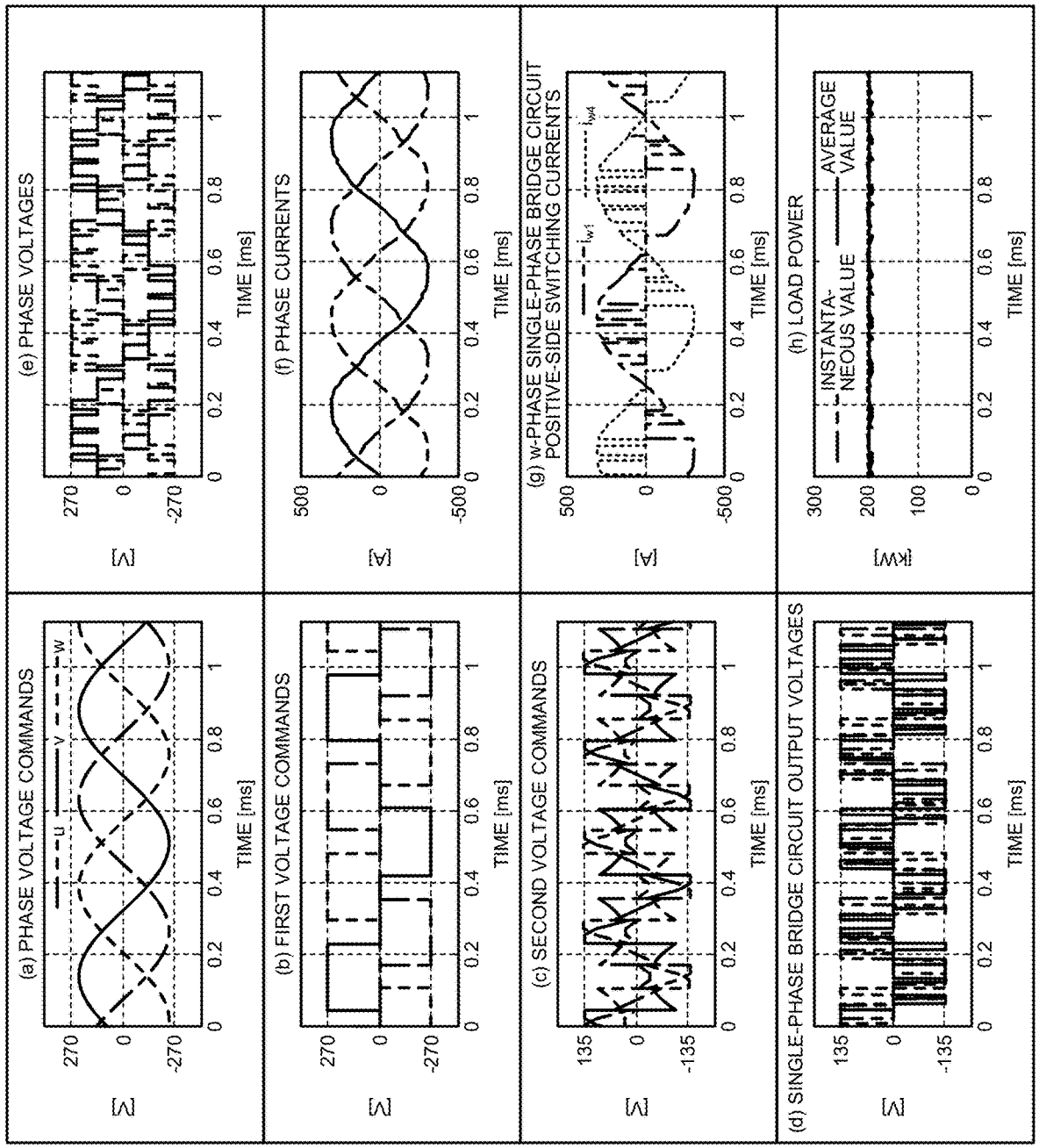
FIG. 9 is a diagram illustrating operating waveforms under non-fault conditions of the power converter according to the first embodiment.

FIG. 9 is a diagram illustrating operating waveforms under non-fault conditions of the power converter 1 according to the first embodiment. In the example of FIG. 9, the DC voltage $v_{mdc}$ of the DC power supply 3 is 540 V, and the absolute value $v_{sdc}$ of the DC-side capacitor voltages of the single-phase bridge circuits 5, 6, and 7 is 135 V.

In the operating waveforms in FIG. 9, (a) is the phase voltage commands to drive the motor. (b) is the first voltage commands to be input to the inverter circuit. (c) is the second voltage commands to be input to the single-phase bridge circuits. As described above, each first voltage command and each second voltage command are one and the other voltage commands divided from the corresponding phase voltage command of the sinusoidal voltage. (d) is the output voltages of the single-phase bridge circuits. (e) is phase voltages applied to the phases of the motor 2. (f) is phase currents flowing through the phases of the motor 2. (g) is currents flowing through the positive-side semiconductor switching elements of the w-phase single-phase bridge circuit. (h) is load power that is power supplied to the motor 2.

As described above, the phase voltage commands to drive the motor 2 are divided into the first voltage commands to be input to the inverter circuit 4 and the second voltage commands to be input to the single-phase bridge circuits 5, 6, and 7, to be supplied to the motor 2. The single-phase bridge circuits 5, 6, and 7 perform PWM control on the second voltage commands and output the DC-side capacitor voltages, whereby load currents are controlled to have a sinusoidal waveform with less distortion. As can be seen from the waveforms of (b) and (c) in FIG. 9, a three-phase common voltage component is superimposed so that the sum of the second voltage commands becomes negative when the sum of the first voltage commands is positive, and so that the sum of the second voltage commands becomes positive when the sum of the first voltage commands is negative. This allows a reduction in the common-mode voltage, and allows reductions in the size and weight of an electromagnetic interference (EMI) filter for reducing the common-mode noise.

Figure 10:
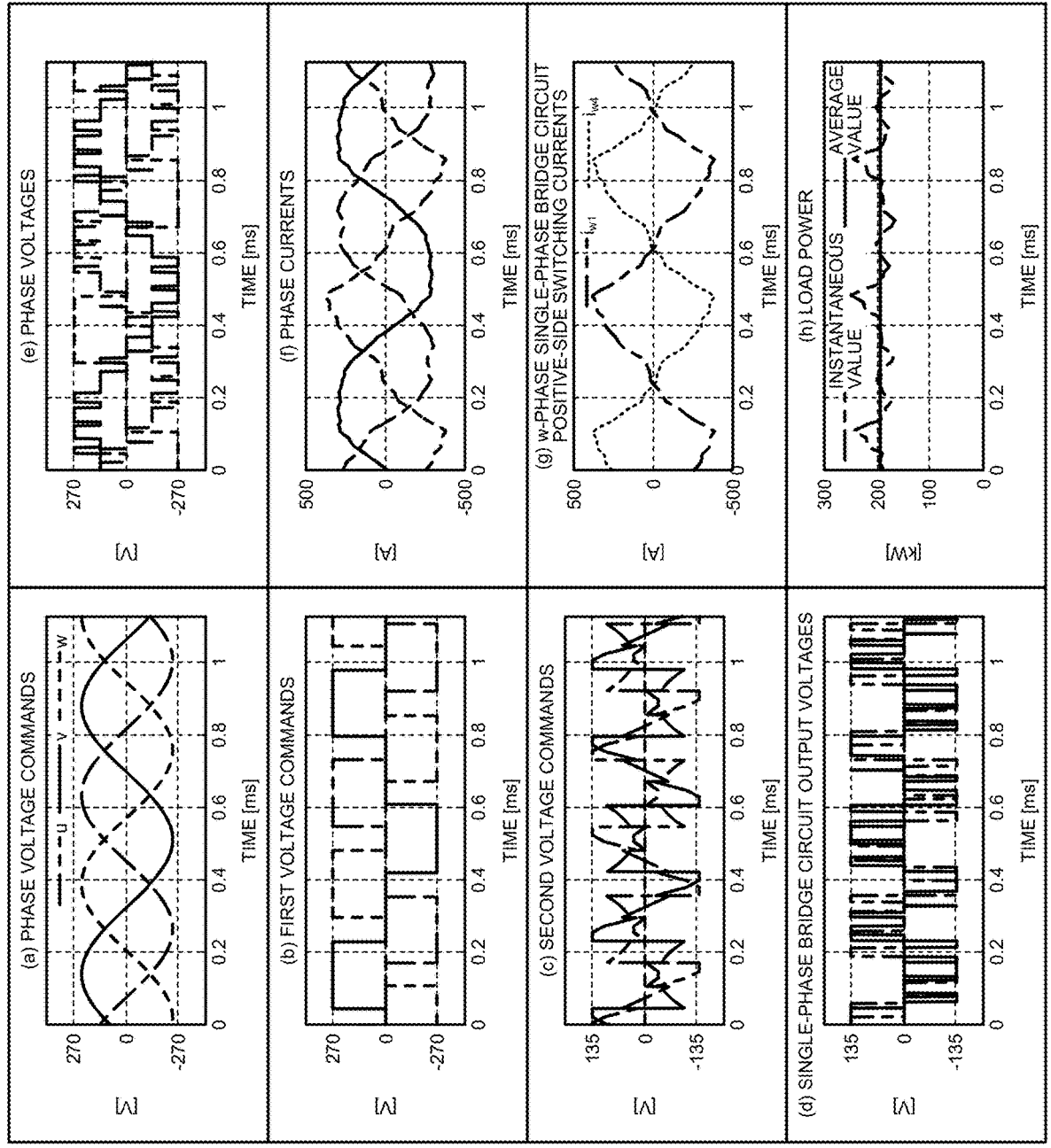
FIG. 10 is a diagram illustrating operating waveforms under fault conditions of the power converter according to the first embodiment.

FIG. 10 is a diagram illustrating operating waveforms under fault conditions of the power converter 1 according to the first embodiment. Specifically, FIG. 10 illustrates operating waveforms when one of the positive-side semiconductor switching elements of the w-phase single-phase bridge circuit 7 has a short-circuit fault, and the two positive-side semiconductor switching elements including the faulty semiconductor switching element are controlled to be on. The types of waveforms represented by (a) to (h) are the same as those in FIG. 9.

The operating waveforms of FIG. 10(d) show that the output voltage of the w-phase single-phase bridge circuit 7 is controlled to zero. As described above, this control can be implemented by continuously turning on the two semiconductor switching elements including the semiconductor switching element with the short-circuit fault of the faulty phase (the w phase in the example of FIG. 10). In FIG. 10(g), a dot-dash line indicates a switching current $i_{w1}$ flowing through the first semiconductor switching element of the w-phase single-phase bridge circuit 7, and a broken line indicates a switching current $i_{w4}$ flowing through the fourth semiconductor switching element of the w-phase single-phase bridge circuit 7. Since the single-phase bridge circuit 7 operates so as to bypass a load current, the currents flowing through the semiconductor switching elements are opposite in current polarity to each other. Comparing the waveform indicated by a broken line in FIG. 10(f) with the waveform indicated by a broken line in FIG. 9(f), the distortion of the w-phase current is larger than that under non-fault conditions. Further, as illustrated in FIG. 10(h), the pulsation of the instantaneous value of the load power is larger than that under non-fault conditions. However, these degrees of distortion and pulsation are allowable. In addition, all the load power is borne by the inverter circuit 4, and thus, as FIG. 10(h) shows, the average value of the load power is kept equivalent to that under normal conditions. Thus, even when the operation of the power converter 1 is continued, required power can be supplied to the motor 2.

As described above, if a semiconductor switching element fails, the power converter according to the first embodiment sets, the output voltage of the single-phase bridge circuit of the phase to which the faulty semiconductor switching element belongs, to zero to continue operation. Consequently, the inverter circuit operates to bear the power of the faulty phase. This allows the continued operation of the power converter without additionally providing a spare inverter even if a semiconductor switching element fails.

Further, the power converter according to the first embodiment can continue power supply to the load without reducing supply power even if a semiconductor switching element fails. This provides an unprecedented remarkable effect of being able to configure a power converter that is low in cost, small in size, and light in weight, and can operate redundantly.

In the power converter according to the first embodiment: a common voltage component is superimposed on the three-phase phase voltage commands so that the sum of the second voltage commands becomes a non-positive value when the sum of the first voltage commands is positive; and a common voltage component is superimposed on the three-phase phase voltage commands so that the sum of the second voltage commands becomes a non-negative value when the sum of the first voltage commands is negative. This allows a reduction in the common-mode voltage, and allows reductions in the size and weight of an EMI filter for suppressing the common-mode noise.

Second Embodiment

In the first embodiment, an embodiment has been described in which if one of the semiconductor switching elements constituting the corresponding single-phase bridge circuit fails, operation can be continued by controlling the output voltage of the single-phase bridge circuit of the faulty phase to zero. On the other hand, if two or more of the semiconductor switching elements constituting the corresponding single-phase bridge circuit fail, the configuration of the first embodiment may not be able to control the output voltage of the single-phase bridge circuit to zero. A second embodiment describes a power converter capable of continuing operation even in such a case.

Figure 11:
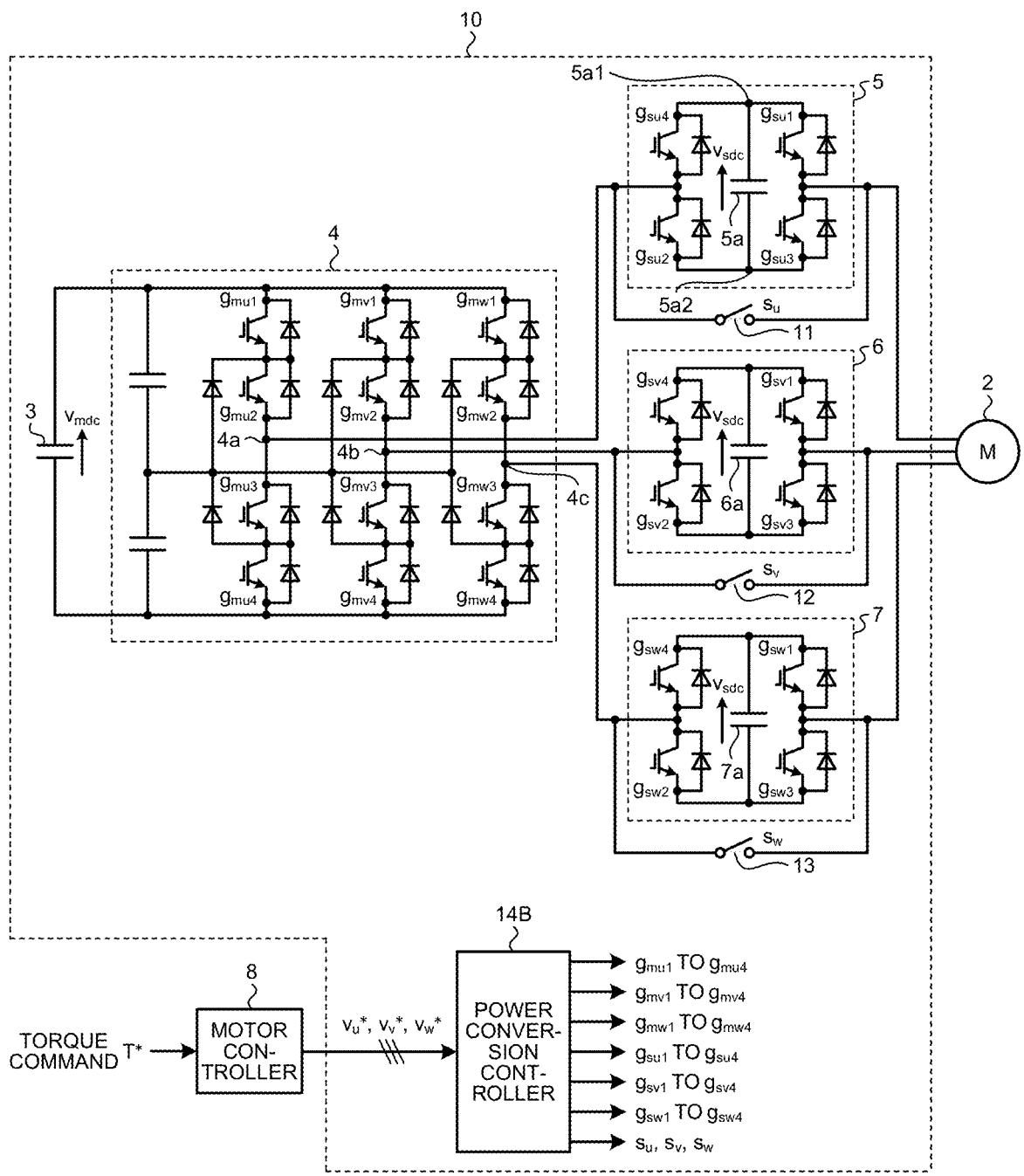
FIG. 11 is a circuit diagram illustrating a configuration of a power converter according to a second embodiment.

FIG. 11 is a circuit diagram illustrating a configuration of a power converter 10 according to the second embodiment. In FIG. 11, in the power converter 10 according to the second embodiment, the power conversion controller 9A is replaced with a power conversion controller 14B, in the configuration of the power converter 1 according to the first embodiment illustrated in FIG. 1. Further, bypass switches 11, 12, and 13 connected in parallel to the single-phase bridge circuits 5, 6, and 7, respectively, are provided. Specifically, the bypass switches 11, 12, and 13 are connected between the respective terminals connected to the AC terminals of the inverter circuit 4 and the respective terminals connected to the motor 2. The other components are the same as or equivalent to the components of the first embodiment. The same reference numerals are assigned to the same or equivalent components without duplicated explanations.

Figure 12:
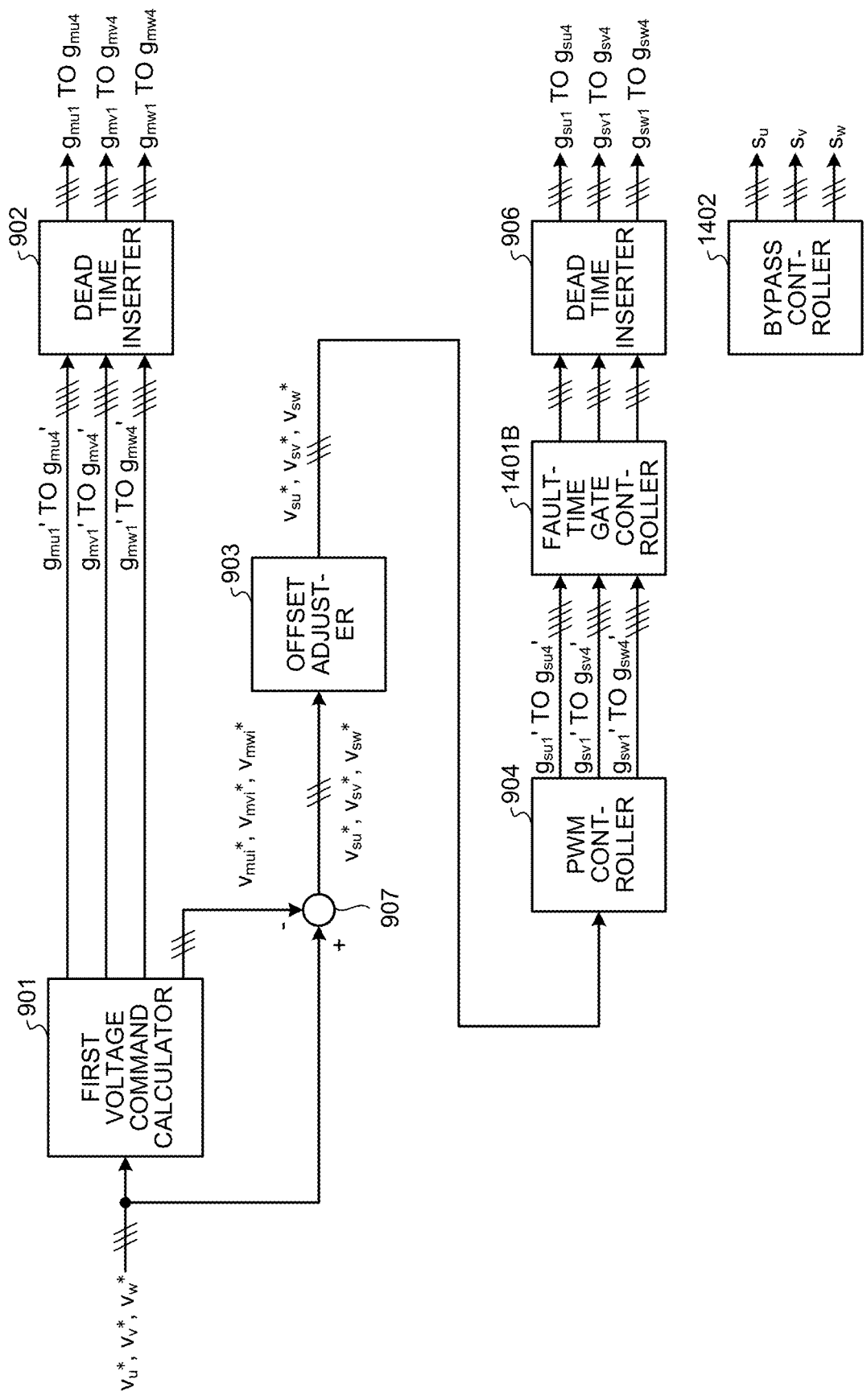
FIG. 12 is a block diagram illustrating a configuration of a power conversion controller in the second embodiment.

FIG. 12 is a block diagram illustrating a configuration of the power conversion controller 14B according to the second embodiment. In FIG. 12, in the power conversion controller 14B according to the second embodiment, the fault-time gate controller 905A is replaced with a fault-time gate controller 1401B, in the configuration of the power conversion controller 9A in the first embodiment illustrated in FIG. 2. Further, a bypass controller 1402 is added. The other components are the same as or equivalent to the components of the first embodiment. The same reference numerals are assigned to the same or equivalent components without duplicated explanations.

If a fault occurs in a semiconductor switching element, the fault-time gate controller 1401B sets all the gate signals to the single-phase bridge circuit of the phase to which the faulty semiconductor switching element belongs to L. On the other hand, when normal operation is performed without occurrence of faults, the gate signals are passed without any processing.

The bypass controller 1402 generates switching signals $s_u$, $s_v$, and $s_w$ to turn on or turn off the bypass switches 11, 12, and 13. The switching signal $s_u$ is a switching signal to turn on or turn off the u-phase bypass switch 11. The switching signal $s_v$ is a switching signal to turn on or turn off the v-phase bypass switch 12. The switching signal $s_w$ is a switching signal to turn on or turn off the w-phase bypass switch 13.

Under normal conditions where no faults of the semiconductor switching elements occur, the bypass controller 1402 sets all the switching signals to L to control to turn off state all the bypass switches 11, 12, and 13. If a fault occurs in a semiconductor switching element, the switching signal to the bypass switch of the faulty phase is controlled to H to turn on the bypass switch of the faulty phase to make the output voltage of the single-phase bridge circuit of the faulty phase zero.

The above-described operation of the bypass switch allows power supply to the motor 2 to be continued even if two or more of the semiconductor switching elements of the single-phase bridge circuit of the faulty phase fail.

In the configuration of the first embodiment, if, for example, the positive-side semiconductor switching element in one leg of the two legs has an open fault, and the negative-side element in the other leg has an open fault, the output voltage of the single-phase bridge circuit cannot be made approximately zero. Further, in the configuration of the first embodiment, if the positive-side semiconductor switching element in one leg has a short-circuit fault, and the negative-side element in the other leg has a short-circuit fault, the output voltage of the single-phase bridge circuit cannot be made approximately zero. Contrarily, in the configuration of the second embodiment using the bypass switches, even if two or more semiconductor switching elements fail, the operation of the power converter can be continued by turning on the bypass switch.

Further, the second embodiment using the bypass switches eliminates the need: to identify the position on the circuit of a faulty semiconductor switching element; and to determine whether the fault is a short-circuit fault or an open fault. This allows easy and quick bypassing of the single-phase bridge circuit of the phase to which the faulty semiconductor switching element belongs, to continue power supply to the load.

Figure 13:
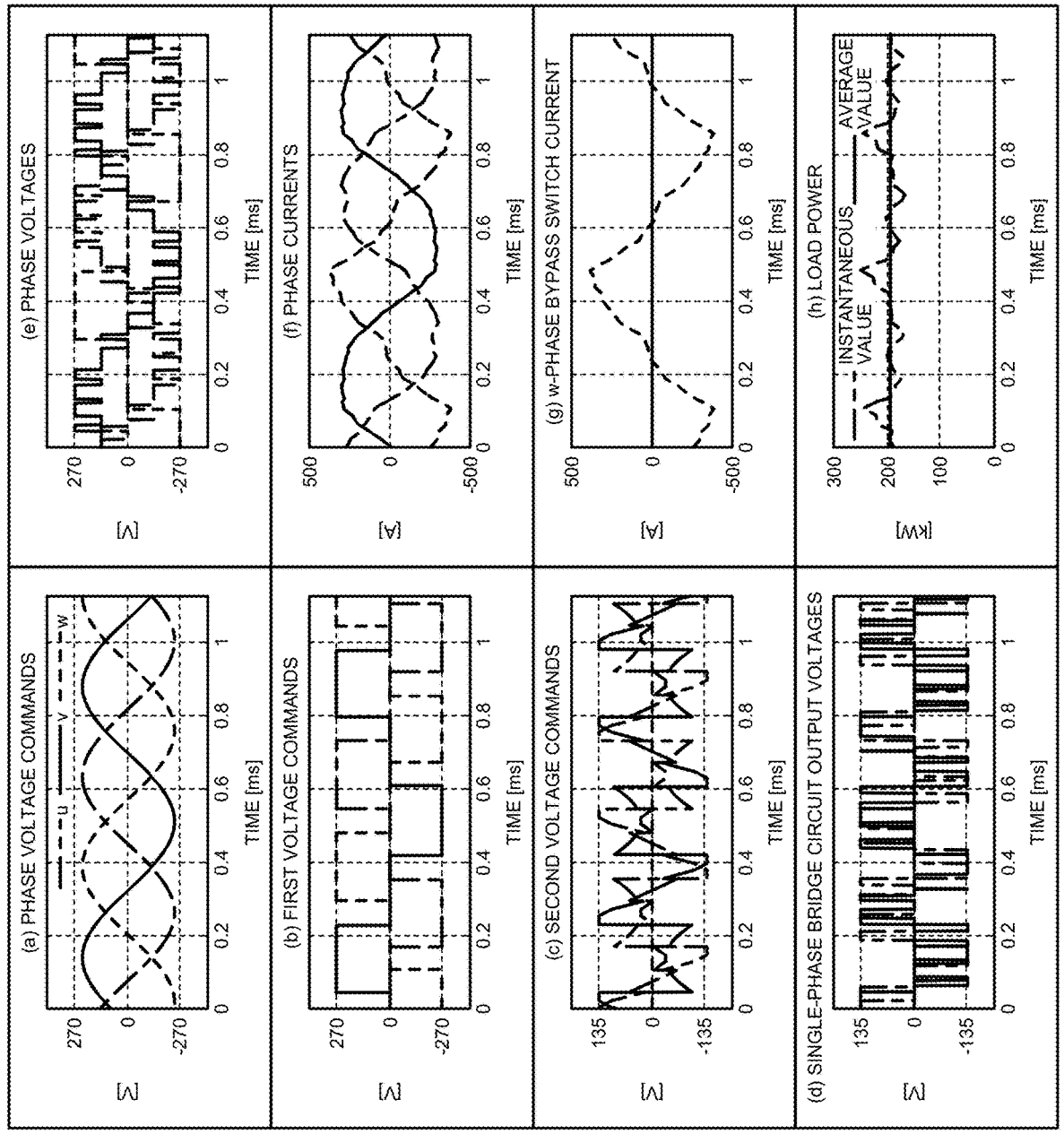
FIG. 13 is a diagram illustrating operating waveforms under fault conditions of the power converter according to the second embodiment.

FIG. 13 is a diagram illustrating operating waveforms under fault conditions of the power converter 10 according to the second embodiment. Specifically, FIG. 13 illustrates operating waveforms when a w-phase semiconductor switching element fails, and the bypass switch of the w-phase that is the phase belonging to the faulty semiconductor switching element is turned on. In the operating waveforms in FIG. 13, (a) is the phase voltage commands to drive the motor. (b) is the first voltage commands to the inverter circuit. (c) is the second voltage commands to the single-phase bridge circuits. (d) is the output voltages of the single-phase bridge circuits. (e) is phase voltages applied to the phases of the motor 2. (f) is phase currents flowing through the phases of the motor 2. (g) is a current flowing through the w-phase bypass switch. (h) is load power supplied to the motor 2.

The operating waveforms of FIG. 13(d) show that the output voltage of the w-phase single-phase bridge circuit 7 is controlled to zero. Comparing the waveform indicated by a broken line in FIG. 13(f) with the waveform indicated by a broken line in FIG. 9(f), the distortion of the w-phase current is larger than that under non-fault conditions. Further, as illustrated in FIG. 13(h), the pulsation of the instantaneous value of the load power is larger than that under non-fault conditions. However, these degrees of distortion and pulsation are allowable. In addition, all the load power is borne by the inverter circuit 4, and thus, as FIG. 13(h) shows, the average value of the load power is kept equivalent to that under normal conditions. Thus, even when the operation of the power converter 10 is continued, required power can be supplied to the motor 2.

As described above, the power converter according to the second embodiment includes the bypass switches connected in parallel to the corresponding single-phase bridge circuits. If a semiconductor switching element fails, the bypass switch of the single-phase bridge circuit of the phase to which the faulty semiconductor switching element belongs is turned on. This allows the continued operation of the power converter without additionally providing a spare inverter even if two or more semiconductor switching elements fail.

If a fault occurs in a semiconductor switching element, the power converter according to the second embodiment preferably performs control to turn off all the gate signals to the single-phase bridge circuit of the phase to which the faulty semiconductor switching element belongs. This control can stabilize the operation of the power converter regardless of difference in fault mode between semiconductor switching elements.

Further, the power converter according to the second embodiment can continue power supply to the load without reducing supply power even if two or more semiconductor switching elements fail. This provides an unprecedented remarkable effect of being able to configure a power converter that is low in cost, small in size, and light in weight, and can operate redundantly.

Third Embodiment

Figure 14:
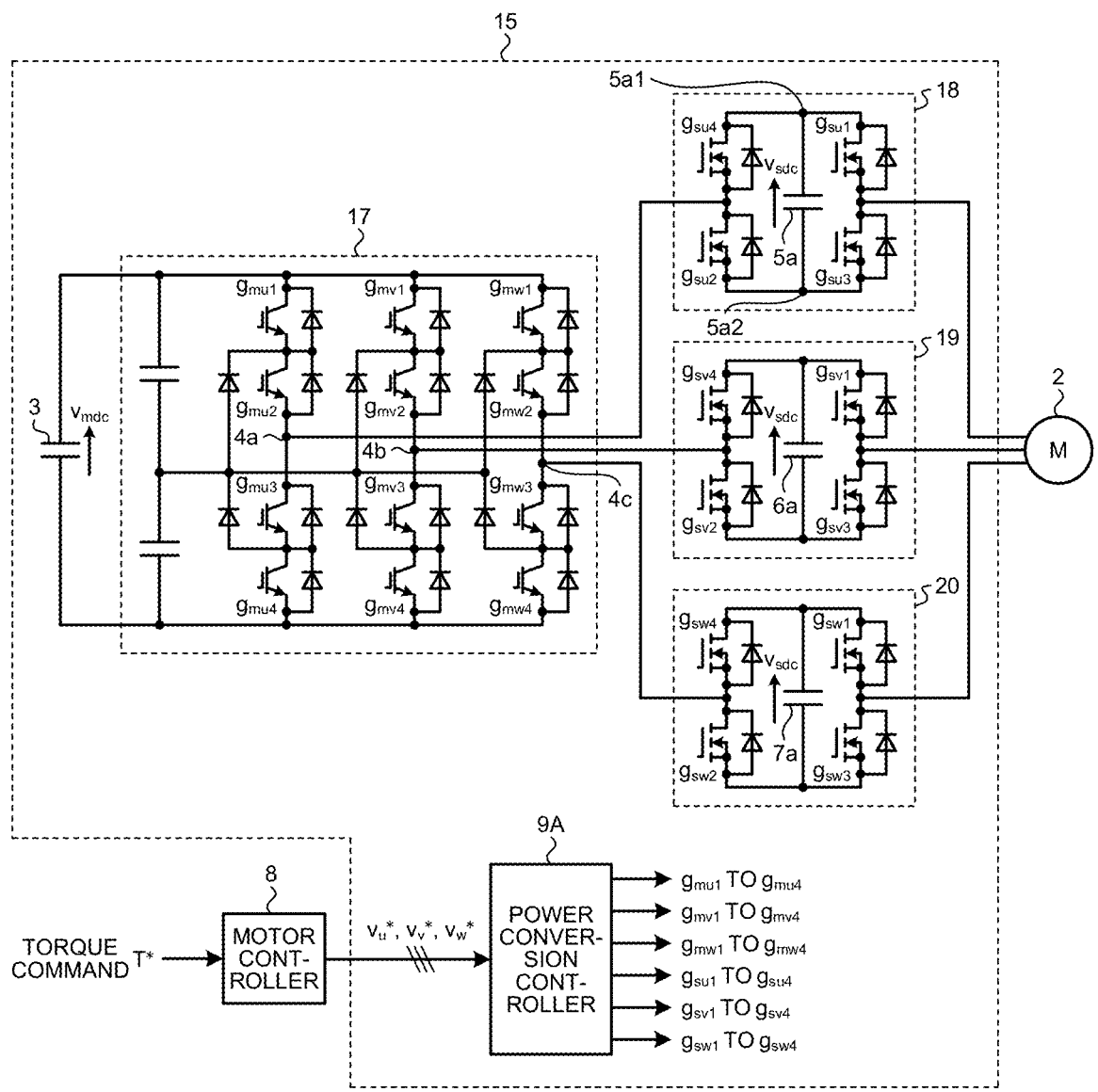
FIG. 14 is a circuit diagram illustrating a configuration of a power converter according to a third embodiment.

A power converter according to a third embodiment has a higher-voltage configuration of the power converter according to the first embodiment. FIG. 14 is a circuit diagram illustrating a configuration of a power converter 15 according to the third embodiment. In FIG. 14, in the power converter 15 according to the third embodiment, the inverter circuit 4 is replaced with an inverter circuit 17 in the configuration of the power converter 1 according to the first embodiment illustrated in FIG. 1. Further, the single-phase bridge circuits 5, 6, and 7 are replaced with single-phase bridge circuits 18, 19, and 20, respectively. The other components are the same as or equivalent to the components of the first embodiment. The same reference numerals are assigned to the same or equivalent components without duplicated explanations.

In the configuration of FIG. 14, the DC voltage $v_{mdc}$ of the DC power supply 3 is 1.5 kV, which is higher than the DC voltage $v_{mdc}$ of the DC power supply 3 in the first embodiment. By increasing the DC voltage $v_{mdc}$ of the DC power supply 3, currents flowing through the power converter 15 are reduced, so that the weight of wiring and the like of the power converter 15 can be reduced. At this time, the absolute value $v_{sdc}$ of the DC-side capacitor voltages of the single-phase bridge circuits 18, 19, and 20 is held at about 375 V, which is about ½ of half the voltage of the DC power supply 3.

Semiconductor switching elements used in the inverter circuit 17 and the single-phase bridge circuits 18, 19, and 20 are selected by taking the following points into consideration.

(a) SiC elements can form semiconductor switching elements having smaller On voltage and switching loss than Si elements.
(b) Widely used Si elements are inexpensive, whereas SiC elements with a high breakdown voltage of, for example, 3.3 kV have just started to be sold and are difficult to obtain and expensive.
(c) IGBTs can reduce On voltage as compared with MOSFETs.

Based on the above points, as the semiconductor switching elements of the inverter circuit 17, for example, Si IGBTs with a breakdown voltage of 3.3 kV are used. For the single-phase bridge circuits 18, 19, and 20, for example, silicon carbide (SiC) MOSFETs with a breakdown voltage of 1.2 kV are used, which are wide bandgap semiconductor devices. That is, the inverter circuit 17 having a high DC voltage uses Si IGBTs, and the single-phase bridge circuits having a low DC voltage use SiC MOSFETs.

When the power converter 15 is operated, the switching frequency of the single-phase bridge circuits 18, 19, and 20 is made higher than the switching frequency of the inverter circuit 17. The inverter circuit 17 is operated at a single pulse voltage. The single-phase bridge circuits 18, 19, and 20 use the SiC MOSFETs, and thus can suppress an increase in switching loss. The inverter circuit 17 uses the Si IGBTs having a smaller On voltage, and thus can suppress an increase in switching loss while reducing conduction loss.

Figure 15:
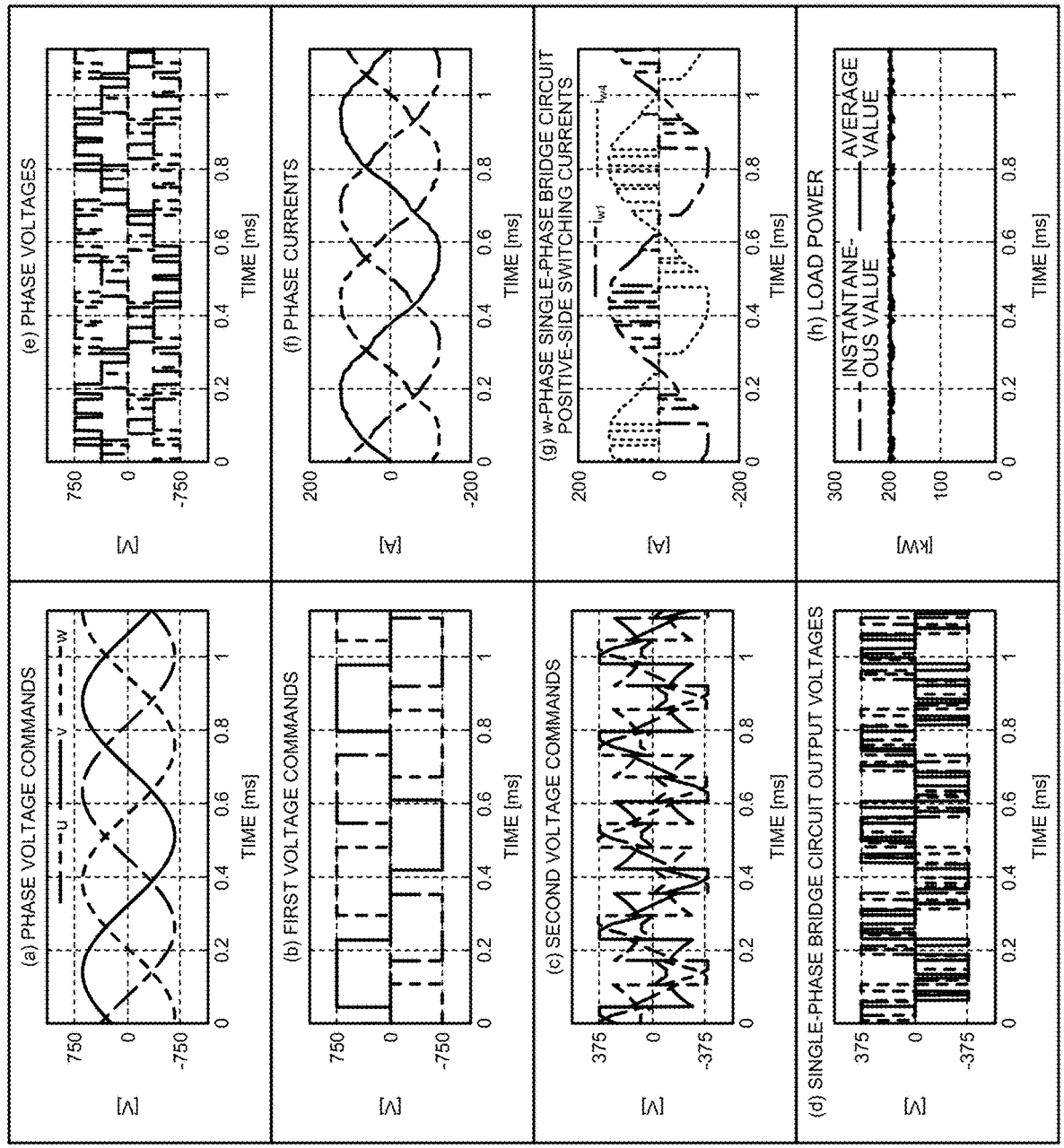
FIG. 15 is a diagram illustrating operating waveforms under non-fault conditions of the power converter according to the third embodiment.
Figure 16:
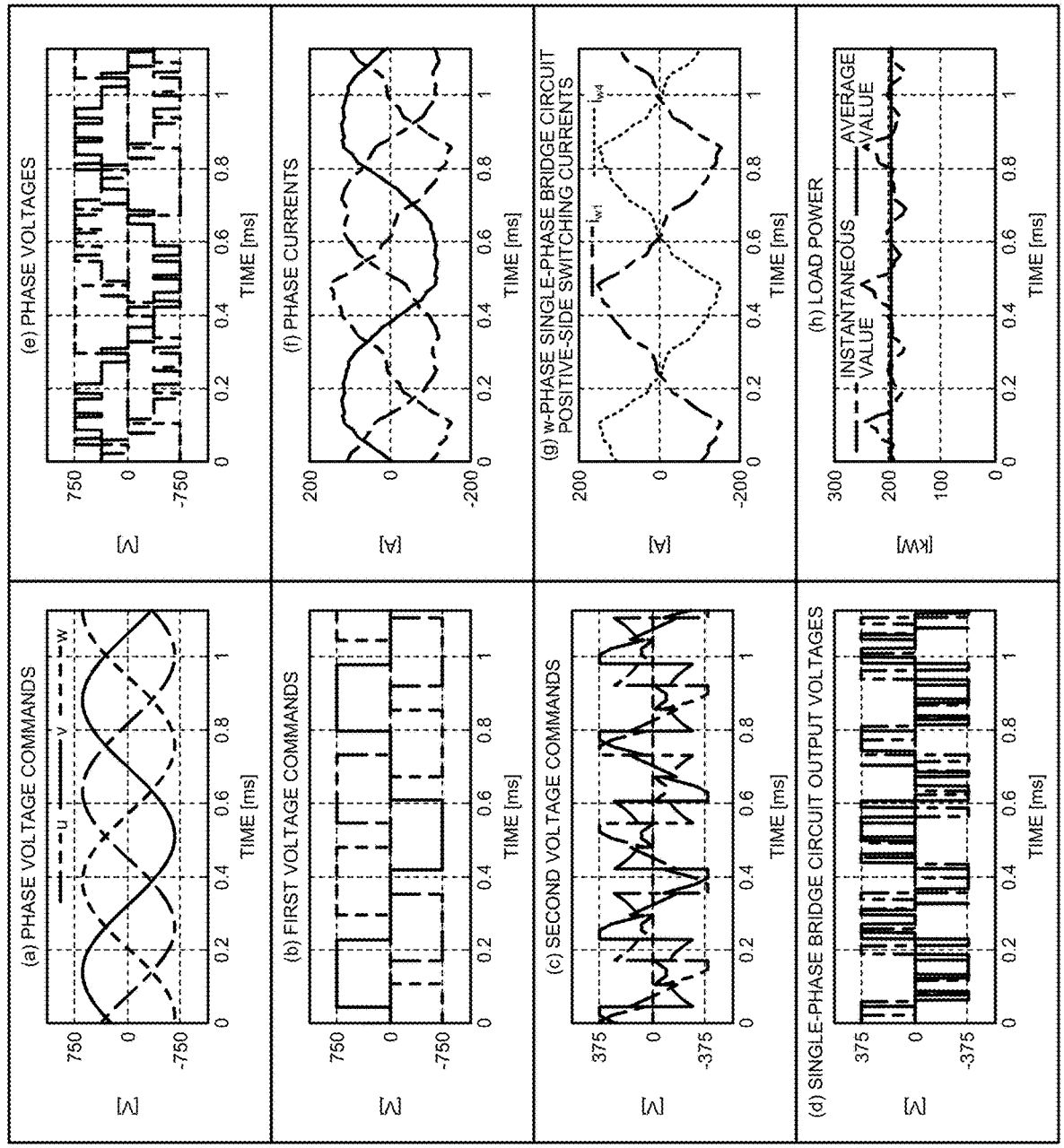
FIG. 16 is a diagram illustrating operating waveforms under fault conditions of the power converter according to the third embodiment.

FIG. 15 is a diagram illustrating operating waveforms under non-fault conditions of the power converter 15 according to the third embodiment. FIG. 16 is a diagram illustrating operating waveforms under fault conditions of the power converter 15 according to the third embodiment. Specifically, FIG. 16 illustrates operating waveforms when one of the negative-side semiconductor switching elements of the w-phase single-phase bridge circuit 20 has an open fault, and the two positive-side semiconductor switching elements constituting the arm opposite to that of the faulty semiconductor switching element are controlled to be on. In each of FIGS. 15 and 16, the types of waveforms represented by (a) to (h) are the same as those in FIG. 9.

As is apparent from comparisons between the operating waveforms of FIGS. 9 and 15 and comparisons between the operating waveforms of FIGS. 10 and 16, each operating waveform changes proportionally except for the amplitude value. Therefore, the same effects as those of the first embodiment can be obtained. Specifically, the power converter according to the third embodiment allows the continued operation of the power converter without additionally providing a spare inverter even if a semiconductor switching element fails. Further, power supply to the load can be continued without reducing supply power even if a semiconductor switching element fails. This provides an unprecedented remarkable effect of being able to configure a power converter that is low in cost, small in size, and light in weight, and can operate redundantly.

In addition to the above effects, the power converter according to the third embodiment can suppress an increase in switching loss while reducing conduction loss even when the power converter has a higher-voltage configuration.

Figure 17:
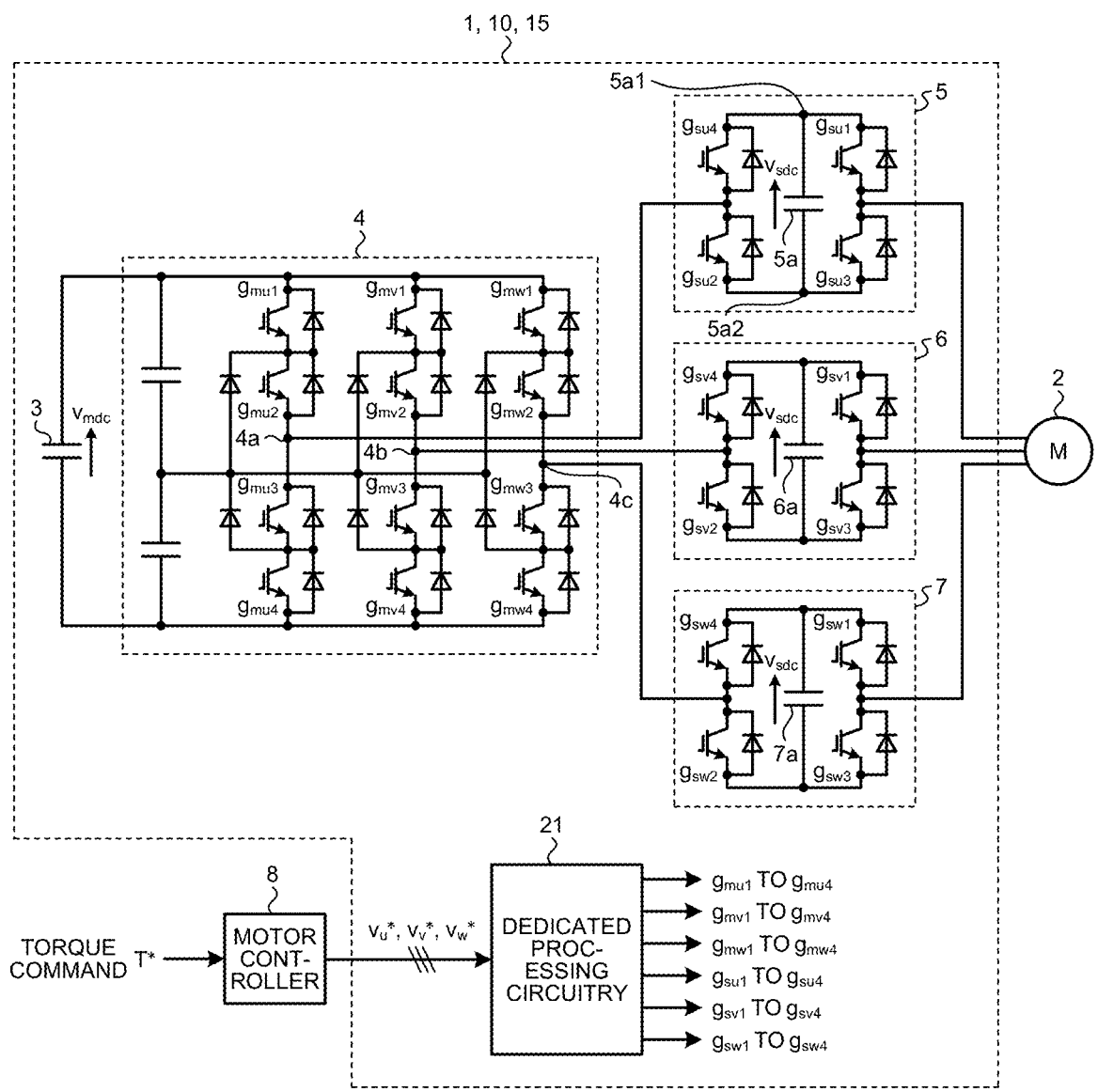
FIG. 17 is a diagram illustrating an example of a hardware configuration that implements the functions of the power conversion controllers according to the first to third embodiments.
Figure 18:
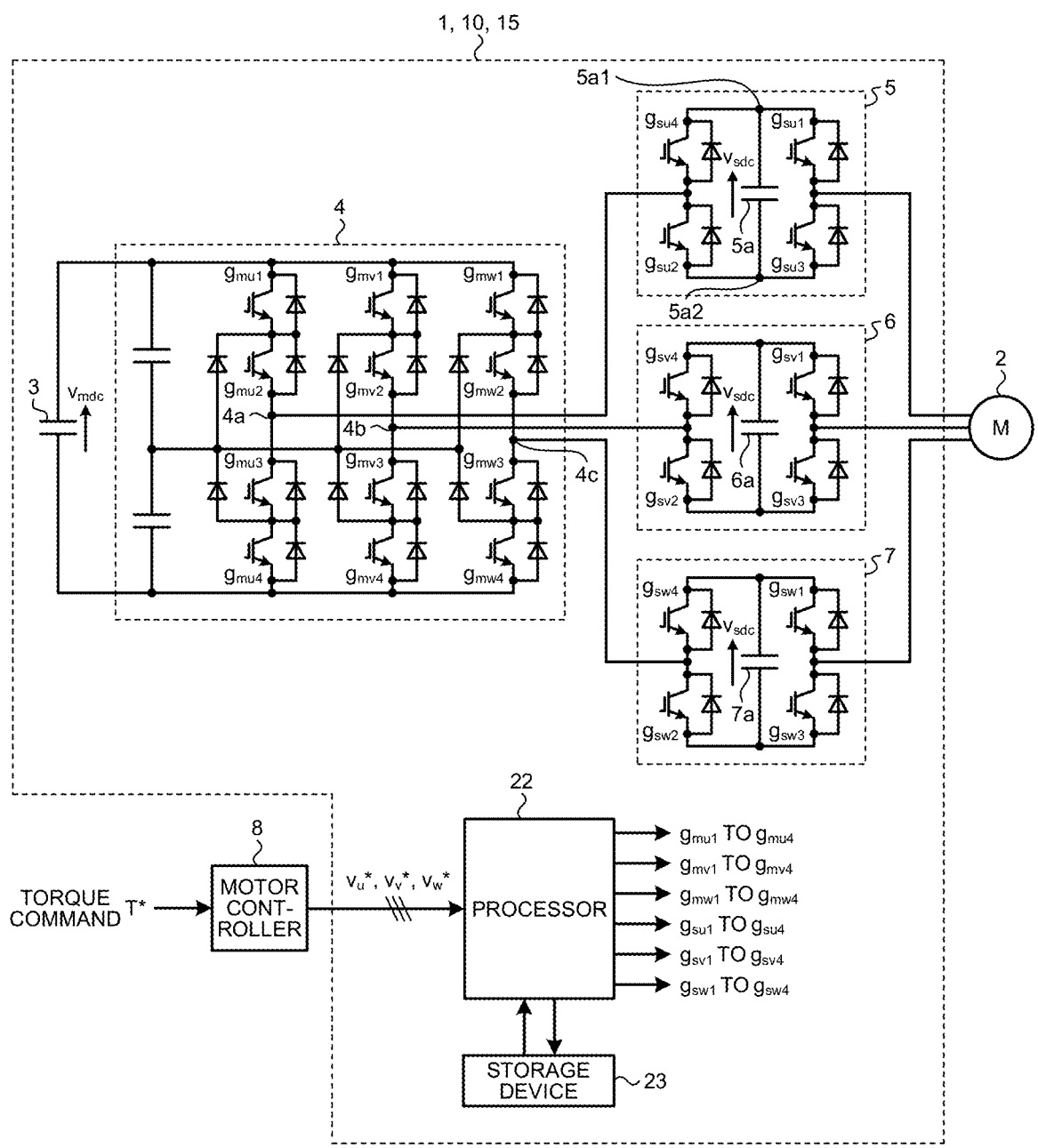
FIG. 18 is a diagram illustrating another example of a hardware configuration that implements the functions of the power conversion controllers according to the first to third embodiments.

Next, a hardware configuration in the power converters according to the first to third embodiments described above will be described with reference to FIGS. 17 and 18. FIG. 17 is a diagram illustrating an example of a hardware configuration that implements the functions of the power conversion controllers 9A and 14B according to the first to third embodiments. FIG. 18 is a diagram illustrating another example of a hardware configuration that implements the functions of the power conversion controllers 9A and 14B according to the first to third embodiments. The functions of the power conversion controllers 9A and 14B refer to the functions of the first voltage command calculator 901, the dead time inserters 902 and 906, the offset adjuster 903, the PWM controller 904, the fault-time gate controllers 905A and 1401B, the subtracter 907, and the bypass controller 1402 included in the power conversion controllers 9A and 14B.

The functions of the power conversion controllers 9A and 14B can be implemented using a processing circuitry. In FIG. 17, the power conversion controllers 9A and 14B in the configurations of the first to third embodiments are replaced with a dedicated processing circuitry 21. When dedicated hardware is used, the dedicated processing circuitry 21 corresponds to a single circuit, a combined circuit, a programmed processor, a parallel-programmed processor, an application-specific integrated circuit (ASIC), a field-programmable gate array (FPGA), or a combination of them. The functions of the power conversion controllers 9A and 14B may each be implemented by a processing circuitry, or may be collectively implemented by a processing circuitry.

In FIG. 18, the power conversion controllers 9A and 14B in the configurations of the first to third embodiments are replaced with a processor 22 and a storage device 23. The processor 22 may be an arithmetic means such as an arithmetic unit, a microprocessor, a microcomputer, a central processing unit (CPU), or a digital signal processor (DSP). The storage device 23 can be exemplified by nonvolatile or volatile semiconductor memory such as random-access memory (RAM), read-only memory (ROM), a flash memory, an erasable programmable ROM (EPROM), or an electrically EPROM (EEPROM) (registered trademark).

When the processor 22 and the storage device 23 are used, the functions of the power conversion controllers 9A and 14B are implemented by software, firmware, or a combination of them. Software or firmware is written as programs and stored in the storage device 23. The processor 22 reads out and executes the programs stored in the storage device 23. These programs can be said to cause a computer to execute procedures and methods of the functions of the power conversion controllers 9A and 14B.

The functions of the power conversion controllers 9A and 14B may be partly implemented by hardware and partly implemented by software or firmware. For example, the functions of the dead time inserters 902 and 906, the PWM controller 904, the fault-time gate controllers 905A and 1401B, and the bypass controller 1402 may be implemented using dedicated hardware; and the functions of the first voltage command calculator 901, the offset adjuster 903, and the subtracter 907 may be implemented using the processor 22 and the storage device 23.

Each of the above embodiments describes, as an example, the case where the load is a motor, and the operating waveforms and the like control the torque of the motor. However, the present invention is not limited to this. The motor may be speed-controlled. The load may be other than a motor. As an example of load connection, the power converter may be connected to a system power supply or another power converter, to be used to control active power or reactive power. Although the DC power supply has been described using the symbol of a voltage source, a battery may be used, or a voltage from a power system rectified using a transformer and a semiconductor switching element may be used. Although the three-phase three-level inverter has been described by illustrating a diode clamp type, the three-phase three-level inverter may be of a capacitor clamp type, or may use a bidirectional switch between the output terminal of each phase and the DC neutral point.

In the third embodiment, the semiconductor switching elements of the inverter circuit are exemplified by the IGBTs with a breakdown voltage of 3.3 kV, and the semiconductor switching elements of the single-phase bridge circuits are exemplified by the MOSFETs with a breakdown voltage of 1.2 kV, but the present invention is not limited to these. The breakdown voltages of the semiconductor switching elements are not limited to the values in the embodiment, and can be freely set. As the wide bandgap semiconductor devices, the SiC elements have been illustrated, but the present invention is not limited to this. In place of the SiC elements, elements formed from silicon carbide (SiC), gallium nitride (GaN), gallium oxide ($Ga_2O_3$), diamond, and the like can be given as examples.

In the third embodiment, the inverter circuit on the high voltage side uses the Si semiconductor switching elements, and the single-phase bridge circuits on the low voltage side use the SiC semiconductor switching elements, but the present invention is not limited to this. The inverter circuit on the high voltage side may use SiC semiconductor switching elements, and the single-phase bridge circuits on the low voltage side may use Si semiconductor switching elements. By thus using SiC elements on the high voltage side, a power converter with a higher DC voltage can be configured.

In each of the above embodiments, the DC-side capacitor voltage of each single-phase bridge circuit is set to about ½ of half the voltage of the DC power supply, but may be set to about ⅓ of half the voltage of the DC power supply. By at least making the DC voltages of each single-phase bridge circuit and the inverter circuit different from each other, different semiconductor switching elements can be used by taking On voltage or switching loss into consideration as described in this document.

A method of setting the DC-side capacitor voltage of each single-phase bridge circuit to about ⅓ of half the voltage of the DC power supply is known. Refer to the following literature.

"Cesar Silva et al, 'Control of a Hybrid Multilevel Inverter for Current Waveform Improvement', IEEE International Symposium on Industrial Electronics, Cambridge, UK, 2008, pp. 2329-2335."

In this document, fault determination is performed using the voltage of the semiconductor switching element and the gate signal, but the present invention is not limited to this. For example, when a power module is used as a semiconductor switching element, a fault signal of the switching element may be used.

In this document, the voltage waveforms of the inverter circuit have been described using a single pulse voltage and a three pulse voltage, but the present invention is not limited to these numbers of pulses. The voltage of a plurality of pulses may be generated by PWM control in which a voltage command and a carrier are compared.

The configurations illustrated in the above embodiments illustrate an example of the subject matter of the present invention, and can be combined with another known art, and can be partly omitted or changed without departing from the scope of the present invention.

REFERENCE SIGNS LIST 1, 10, 15 power converter; 2 motor; 3 DC power supply; 4, 17 inverter circuit; 4a, 4b, 4c AC terminal; 5, 6, 7, 18, 19, 20 single-phase bridge circuit; 5a, 6a, 7a capacitor; 5a1, 5a2 terminal; 8 motor controller; 9A, 14B power conversion controller; 11, 12, 13 bypass switch; 21 dedicated processing circuitry; 22 processor; storage device; 901 first voltage command calculator; 902, 906 dead time inserter; 903 offset adjuster; 904 PWM controller; 905A, 1401B fault-time gate controller; 907 subtracter; 1402 bypass controller.

The invention claimed is:

1. A power converter to convert DC power into AC power to be supplied to a load to supply active AC power to the load, the power converter comprising:
an inverter circuit connected between positive and negative terminals of a DC power supply;
three single-phase bridge circuits each connected in series between an AC terminal of one of different phases of the inverter circuit and the load; and
a power conversion controller to generate, based on phase voltage commands, gate signals to control operations of the inverter circuit and the three single-phase bridge circuits, wherein
when a semiconductor switching element of one of the single-phase bridge circuits fails, the power conversion controller sets an output voltage of the single-phase bridge circuit of a phase to which the faulty semiconductor switching element belongs to zero to continue operation to supply the active AC power,
when the phase to which the faulty semiconductor switching element belongs is referred to as a faulty phase,
the power conversion controller generates the gate signals to turn on two of the semiconductor switching elements on a negative side in both legs of the single-phase bridge circuit of the faulty phase when the semiconductor switching element on the negative side has a short-circuit fault, the power conversion controller generates the gate signals to turn on two of the semiconductor switching elements on a positive side in both legs of the single-phase bridge circuit of the faulty phase when the semiconductor switching element on the positive side has a short-circuit fault, the power conversion controller generates the gate signals to turn on two of the semiconductor switching elements on the negative side in both legs of the single-phase bridge circuit of the faulty phase when the semiconductor switching element on the positive side has an open fault, and the power conversion controller generates the gate signals to turn on two of the semiconductor switching elements on the positive side in both legs of the single-phase bridge circuit of the faulty phase when the semiconductor switching element on the negative side has an open fault.

2. The power converter according to claim 1, further comprising:

bypass switches connected in parallel to the corresponding single-phase bridge circuits of the respective phases, wherein the power conversion controller controls to turn on one of the bypass switches connected to the single-phase bridge circuit of the faulty phase when the semiconductor switching element of the single-phase bridge circuit fails.

3. The power converter according to claim 2, wherein when the semiconductor switching element fails, the power conversion controller turns off all the gate signals to the single-phase bridge circuit of the faulty phase.

4. The power converter according to claim 2, wherein the power conversion controller controls to turn on one of the bypass switches, of the bypass switches, which is connected to the single-phase bridge circuit of the faulty phase, when two or more of the semiconductor switching elements of the single-phase bridge circuit fail.

5. The power converter according to claim 1 wherein the inverter circuit uses semiconductor switching elements formed from a narrow bandgap semiconductor, and the single-phase bridge circuits use semiconductor switching elements formed from a wide bandgap semiconductor.

6. The power converter according to claim 1 wherein a switching frequency of the single-phase bridge circuits is higher than a switching frequency of the inverter circuit.

7. The power converter according to claim 1 wherein a DC-side capacitor voltage of the single-phase bridge circuits is half a phase-voltage step width of the inverter circuit or less.

8. The power converter according to claim 1 wherein the power conversion controller divides the phase voltage commands of sinusoidal voltages into first voltage commands to command the inverter circuit and second voltage commands to command the three corresponding single-phase bridge circuits, and when the sum of the first voltage commands is a positive value, the power conversion controller superimposes a common voltage component on each of the three second voltage commands so that the sum of the three second voltage commands becomes a non-positive value, or when the sum of the first voltage commands is a negative value, the power conversion controller superimposes a common voltage component on each of the three second voltage commands so that the sum of the three second voltage commands becomes a non-negative value.

9. The power converter according to claim 8, wherein the inverter circuit outputs fundamental wave components of the sinusoidal voltages.

10. The power converter according to claim 8, wherein the first voltage commands are a single pulse voltage whose absolute value is ½ of a voltage of the DC power supply and whose polarity is a positive or negative voltage each repeated once in a fundamental wave period of the phase voltage commands.

11. The power converter according to claim 10, wherein with respect to a phase and a phase angle $\alpha$ of the phase voltage commands, the single pulse voltage is a zero value when the phase is in ranges of zero to $\alpha$, $\pi-\alpha$ to $\pi+\alpha$, and $2\pi-\alpha$ to $2\pi$, is a positive value when the phase is in a range of $\alpha$ to $\pi-\alpha$, and is a negative value when the phase is in a range of $\pi+\alpha$ to $2\pi-\alpha$, and the phase angle $\alpha$ is determined by formula (1) below where $v_{php}$ is an amplitude of the phase voltage commands, and $v_{mdc}$ is a DC voltage of the inverter circuit

[Formula 1]

$$\alpha = \cos^{-1}(\|v_{php}\pi/2\|_{mdc}) \tag{1}$$

12. The power converter according to claim 1, wherein the inverter circuit is a three-level inverter.

* * * * *